US012636212B2

(12) United States Patent
Shein et al.

(10) Patent No.: US 12,636,212 B2
(45) Date of Patent: May 26, 2026

(54) LATERAL PATIENT POSITIONING SYSTEM

(71) Applicant: Alphatec Spine, Inc., Carlsbad, CA (US)

(72) Inventors: Aaron Shein, El Cajon, CA (US); Aaron Brinker, Carlsbad, CA (US); Andrew W. Rajek, Escondido, CA (US); Zachary Stroh, Nevada City, CA (US)

(73) Assignee: Alphatec Spine, Inc., Carlsbad, CA (US)

( * ) Notice: Subject to any disclaimer, the term of this patent is extended or adjusted under 35 U.S.C. 154(b) by 613 days.

(21) Appl. No.: 18/138,431

(22) Filed: Apr. 24, 2023

(65) Prior Publication Data

US 2024/0350347 A1 Oct. 24, 2024

(51) Int. Cl.
*A61G 13/00* (2006.01)
*A61G 13/12* (2006.01)

(52) U.S. Cl.
CPC ........ *A61G 13/0054* (2016.11); *A61G 13/121* (2013.01); *A61G 13/122* (2013.01); *A61G 13/123* (2013.01); *A61G 13/1235* (2013.01); *A61G 13/1245* (2013.01)

(58) Field of Classification Search
None
See application file for complete search history.

(56) References Cited

U.S. PATENT DOCUMENTS

| | | | |
|---|---|---|---|
| 1,830,071 | A | 11/1931 | Patton |
| 2,691,979 | A | 10/1954 | Watson |
| 3,823,709 | A | 7/1974 | Mcguire |
| 5,079,789 | A | 1/1992 | Jandrakovic |
| 5,088,706 | A | 2/1992 | Jackson |
| 5,131,106 | A | 7/1992 | Jackson |
| 5,311,622 | A | 5/1994 | Allen |
| 5,390,383 | A | 2/1995 | Carn |
| 5,422,928 | A | 6/1995 | Payne |
| D390,958 | S | 2/1998 | Lathrop |
| 5,724,970 | A | 3/1998 | Votruba et al. |
| 5,758,647 | A | 6/1998 | Cummins |

(Continued)

FOREIGN PATENT DOCUMENTS

| | | | |
|---|---|---|---|
| CA | 2962567 | A1 | 3/2016 |
| CN | 202342383 | U | 7/2012 |

(Continued)

OTHER PUBLICATIONS

EPO acting as International Searching Authority, "International Search Report and Written Opinion," for international application No. PCT/US2024/023746, mailed Jul. 9, 2024.

(Continued)

*Primary Examiner* — Adam C Ortiz

(74) *Attorney, Agent, or Firm* — Dentons Durham Jones Pinegar; Sarah W. Matthews

(57) ABSTRACT

A lateral patient positioning system may include a pelvic bolster assembly and a thoracic bolster assembly. Each of the assemblies may be attached to a conventional surgical table frame by the surgical table frame's longitudinal rails. A plurality of adjustment mechanisms and components are provided to allow for easy and safe manipulation of a patient before and during surgery, including sagittal and/or coronal adjustment of a patient in a lateral position.

20 Claims, 9 Drawing Sheets

(56) References Cited

U.S. PATENT DOCUMENTS

| | | | |
|---|---|---|---|
| 6,003,176 | A | 12/1999 | Wasley et al. |
| 6,076,525 | A | 6/2000 | Hoffman |
| 6,260,220 | B1 | 7/2001 | Lamb et al. |
| 6,311,349 | B1 | 11/2001 | Kazakia et al. |
| 6,374,438 | B1 | 4/2002 | Fox et al. |
| 6,934,987 | B2 | 8/2005 | Newkirk et al. |
| 6,941,951 | B2 | 9/2005 | Hubert et al. |
| 7,120,954 | B2 | 10/2006 | Traut et al. |
| 7,185,656 | B2 | 3/2007 | Wakhloo et al. |
| 7,189,214 | B1 | 3/2007 | Saunders |
| 7,234,180 | B2 | 6/2007 | Horton et al. |
| 7,600,281 | B2 | 10/2009 | Skripps |
| 8,099,808 | B1 | 1/2012 | Mckeon |
| 8,118,029 | B2 | 2/2012 | Gneiting et al. |
| 8,234,730 | B2 | 8/2012 | Skripps |
| 8,286,283 | B2 | 10/2012 | Copeland et al. |
| D676,971 | S | 2/2013 | Sharps |
| 8,635,725 | B2 | 1/2014 | Tannoury et al. |
| 8,707,476 | B2 | 4/2014 | Sharps |
| 8,973,188 | B1 | 3/2015 | Amini |
| 9,072,646 | B2 | 7/2015 | Skripps et al. |
| 9,168,009 | B2 | 10/2015 | Lee |
| 9,192,534 | B2 | 11/2015 | Coppens et al. |
| 9,254,217 | B2 | 2/2016 | Zacharopoulos et al. |
| 9,339,430 | B2 | 5/2016 | Jackson et al. |
| 9,446,260 | B2 | 9/2016 | Jagger |
| 9,498,397 | B2 | 11/2016 | Hight et al. |
| 9,522,078 | B2 | 12/2016 | Pizzini |
| 9,554,959 | B2 | 1/2017 | Carn |
| 9,622,928 | B2 | 4/2017 | Jackson et al. |
| 9,750,657 | B2 | 9/2017 | Drake |
| 9,937,006 | B2 | 4/2018 | Skripps et al. |
| 10,045,768 | B2 | 8/2018 | Garcia-Bengochea et al. |
| 10,314,758 | B2 | 6/2019 | Dolliver |
| 10,335,097 | B2 | 7/2019 | Kaiser et al. |
| 10,335,338 | B2 | 7/2019 | Nichols et al. |
| 10,426,684 | B2 | 10/2019 | Dubois et al. |
| 10,729,607 | B2 | 8/2020 | Jackson et al. |
| 10,751,240 | B2 | 8/2020 | Lim et al. |
| 10,813,807 | B2 | 10/2020 | Bartley |
| 10,835,438 | B2 | 11/2020 | Jackson |
| 10,835,439 | B2 | 11/2020 | Lim et al. |
| 10,849,809 | B2 | 12/2020 | Lim et al. |
| 10,869,798 | B2 | 12/2020 | Jackson et al. |
| 10,874,570 | B2 | 12/2020 | Lim et al. |
| 10,881,566 | B2 | 1/2021 | Jackson |
| 10,881,570 | B2 | 1/2021 | Lim et al. |
| 10,888,484 | B2 | 1/2021 | Lim et al. |
| 10,893,996 | B2 | 1/2021 | Lim et al. |
| 10,900,448 | B2 | 1/2021 | Lim et al. |
| 11,013,570 | B2 | 5/2021 | Skripps et al. |
| 2004/0133979 | A1 | 7/2004 | Newkirk et al. |
| 2006/0123546 | A1 | 6/2006 | Horton et al. |
| 2006/0162076 | A1 | 7/2006 | Bartlett et al. |
| 2006/0248650 | A1 | 11/2006 | Skripps |
| 2009/0199339 | A1 | 8/2009 | Barr |
| 2010/0192300 | A1 | 8/2010 | Tannoury et al. |
| 2014/0137327 | A1 | 5/2014 | Tannoury et al. |
| 2016/0000621 | A1 | 1/2016 | Jackson et al. |
| 2016/0151224 | A1 | 6/2016 | Ferro et al. |
| 2016/0193098 | A1 | 7/2016 | Nichols et al. |
| 2016/0193099 | A1 | 7/2016 | Drake |
| 2016/0331613 | A1 | 11/2016 | Lee et al. |
| 2017/0112698 | A1 | 4/2017 | Hight et al. |
| 2017/0319411 | A1 | 11/2017 | Jackson |
| 2018/0011689 | A1 | 1/2018 | Motamedi et al. |
| 2018/0221229 | A1 | 8/2018 | Kaiser et al. |
| 2019/0000707 | A1 | 1/2019 | Lim et al. |
| 2019/0117488 | A1 | 4/2019 | Ebara |
| 2019/0209409 | A1 | 7/2019 | Jackson et al. |
| 2019/0281984 | A1 | 9/2019 | Richardson et al. |
| 2020/0281787 | A1 | 9/2020 | Ruiz |
| 2020/0281788 | A1 | 9/2020 | Lim et al. |
| 2020/0281789 | A1 | 9/2020 | Jackson |
| 2020/0297568 | A1 | 9/2020 | Lim et al. |
| 2020/0315892 | A1 | 10/2020 | Jackson |
| 2020/0330309 | A1 | 10/2020 | Jackson et al. |
| 2020/0330310 | A1 | 10/2020 | Jackson et al. |
| 2020/0337923 | A1 | 10/2020 | Lim et al. |
| 2020/0337926 | A1 | 10/2020 | Lim et al. |
| 2020/0337927 | A1 | 10/2020 | Lim et al. |
| 2020/0337929 | A1 | 10/2020 | Lim |
| 2020/0360214 | A1 | 11/2020 | Lim et al. |
| 2021/0015693 | A1 | 1/2021 | Lim |
| 2021/0113395 | A1 | 4/2021 | Viveros Hudin et al. |
| 2021/0236369 | A1* | 8/2021 | Lee ...................... A61G 13/122 |
| 2022/0040021 | A1 | 2/2022 | Ebara |
| 2022/0125396 | A1* | 4/2022 | Lim ....................... A61B 90/10 |
| 2022/0280367 | A1 | 9/2022 | Diodato et al. |

FOREIGN PATENT DOCUMENTS

| | | | |
|---|---|---|---|
| CN | 213788296 | U | 7/2021 |
| DE | 102009034613 | A1 | 2/2011 |
| DE | 202013100213 | U1 | 3/2013 |
| EP | 1163881 | B1 | 3/2006 |
| EP | 1219276 | B1 | 8/2006 |
| EP | 1874255 | B1 | 2/2014 |
| FR | 2814941 | A1 | 4/2002 |
| JP | 4083129 | B2 | 4/2008 |
| JP | 5311235 | B2 | 10/2013 |
| WO | 2009076483 | A1 | 6/2009 |
| WO | 2013058806 | A1 | 4/2013 |
| WO | 2014193739 | A1 | 12/2014 |
| WO | 2017183632 | A1 | 10/2017 |

OTHER PUBLICATIONS

Australian Patent Office, "First Examination Report," Australian Application No. 2021215729, Sep. 6, 2023.

European Patent Office, "Extended European Search Report," European Aplication No. 21750233, filed Jan. 29, 2024.

International Bureau, "Notification Concerning International Preliminary Report on Patentability," for International Application No. PCT/US2021/016095, issued Jul. 28, 2022, mailed Aug. 18, 2022.

USPTO acting as International Searching Authority, "International Search Report and Written Opinion," for international application No. PCT/US2021/016095, mailed Apr. 8, 2021.

European Patent Office, "Extended European Search Report," for European Patent Application No. 25198827.5, Nov. 24, 2025.

* cited by examiner

LATERAL PATIENT POSITIONING SYSTEM

TECHNICAL FIELD

The present disclosure relates generally to a patient positioning system which may be used to position and/or manipulate a patient during spine surgery. More specifically, the present disclosure relates to a patient positioning system with a thoracic and pelvic support for supporting a patient in a lateral recumbent or lateral decubitus position.

RELATED ART

Spinal surgery may be used to treat various conditions, such as degenerative disc disease, recurrent disc herniation, spinal instability, spondylolisthesis, pseudoarthrosis, osteomyelitis/discitis, post-laminectomy syndrome and trauma. Various approaches may be taken by a surgeon for spinal surgery, including from the back (posterior), front (anterior), and side (lateral). Lateral access may be preferred as a less invasive approach than anterior access and may provide better positioning than posterior access. Lateral access may be achieved when a patient is in a prone position or in a lateral position, such as the lateral decubitus position. The lateral decubitus position can also allow for convenient access posteriorly and anteriorly.

When the patient is in a lateral position, successful lateral access requires a patient support structure that can be rotated, articulated and angulated so that the patient can be moved and intra-operative extension and flexion of at least a portion of the spinal column can be achieved to change lumbar lordosis and/or thoracic kyphosis. The patient support structure may also be capable of cooperating with the biomechanics of the patient for easy, selective adjustment of the patient intraoperatively.

SUMMARY

According to one aspect, a patient positioning system may include a thoracic bolster assembly and a pelvic bolster assembly. In some configurations, the thoracic bolster assembly and pelvic bolster assembly are adjustable in a sagittal plane to effect a desired lordosis and/or kyphosis by adjusting in a posterior and/or anterior direction. The thoracic and pelvic bolster assemblies may also be attached to a surgical bed frame such that they can be longitudinally adjusted along the opposing rails of the surgical bed frame. In some configurations, the thoracic bolster assembly and pelvic bolster assembly are adjustable in a coronal plane to allow greater access to the lumbar spine by moving the ribs and/or iliac crest away from a desired access route.

According to one aspect, the thoracic bolster assembly can include: a frame, a base and an upper portion, the base in connection with the frame via an angular adjustment mechanism to adjust the base in a coronal plane to allow for greater access to the lumbar spine; the frame comprising a first rail coupler on a first anterior side and a second rail coupler on an opposing posterior side, the first and second rail couplers slidably mountable on opposing rails of a surgical bed frame allowing the thoracic bolster assembly to be adjusted longitudinally along the opposing rails of the surgical bed frame; wherein the base of the thoracic bolster assembly is further adjustable in a posterior and/or anterior direction relative to the base.

According to another aspect, the thoracic bolster assembly can include a thoracic anterior paddle removably attached to a first anterior side of the upper portion to support a patient's chest and a thoracic posterior paddle removably attached to a second posterior side of the upper portion to support a posterior portion of a patient's head and shoulders.

According to another aspect, the pelvic bolster assembly can include: a frame, a base and an upper portion, the upper portion in connection with the base via an angular adjustment mechanism to cause movement in a coronal plane and achieve greater access to the lumbar spine; the base comprising a first rail coupler on a first anterior side and a second rail coupler on an opposing posterior side, the first and second rail couplers slidably mountable on opposing rails of a surgical bed frame allowing the thoracic bolster assembly to be adjusted longitudinally along the opposing rails of the surgical bed frame; wherein the upper portion of the thoracic bolster assembly is further adjustable in a posterior and/or anterior direction relative to the base.

According to another aspect, the pelvic bolster assembly can include: a pelvic anterior paddle removably attached to a first anterior side of the upper portion to support the patient's anterior pelvis and a pelvic posterior paddle removably attached to a second posterior side of the upper portion to support the patient's posterior pelvis.

In some configurations, the thoracic bolster assembly further comprises a head support coupled to the thoracic posterior paddle. The system may also include a lower arm support attachable to the first anterior side of the upper portion of the thoracic paddle assembly. The lower arm support can be adjusted between a first, laterally extended position and a second, longitudinally extended position.

The head support can be coupled to the posterior paddle via an adjustable arm. The adjustable arm can be connected to posterior paddle via a dovetail hinge on a top side of the posterior paddle, such that the arm may be removed and placed via vertically.

In some configurations, at least one of the first anterior paddle, second anterior arm paddle, posterior paddle, upper portion of the thoracic bolster, and the upper portion of the pelvic bolster further comprises a deformable pad removably attached thereto.

According to another aspect, the pelvic posterior paddle further comprises a thigh support. The thigh support can be adjustable in the coronal plane and a sagittal plane. Similarly, the thoracic anterior paddle and the thoracic posterior paddle can be adjustable in the coronal plane and a sagittal plane, and/or the pelvic anterior paddle and the pelvic posterior paddle are adjustable in the coronal plane and a sagittal plane. Such adjustments may be achieved by sliding the paddles either toward or away from the surgical table and/or by pivoting the paddles either toward or away from the patient as well as, optionally, pivoting the paddles toward the patient's head or toward the patient's feet.

According to another aspect, the upper portion is connected to the base via a screw and nut, wherein the screw comprises a drive having a recess formed therein, the patient positioning system further comprising a handle with a boss for insertion into the recess of the screw to turn the screw and move the upper portion relative to the base in a posterior and/or anterior direction.

According to yet another aspect, a method can be provided for placing or loading a patient on a lateral patient positioning system. The method can include selecting a patient positioning system as described herein, and adjusting the thoracic bolster assembly longitudinally along the opposing rails of the surgical bedframe, and adjusting the pelvic bolster assembly longitudinally along the opposing rails of the surgical bedframe. The method can also include placing a thoracic bolster assembly loading bolster adjacent to the upper portion of the thoracic bolster assembly, and placing a pelvic bolster assembly loading bolster adjacent to the upper portion of the pelvic bolster assembly.

The method can include placing the patient in a supine position over the thoracic bolster assembly and the pelvic bolster assembly, and then rotating the patient from the supine position to a lateral position, removing both the thoracic bolster assembly loading bolster and the pelvic bolster assembly loading bolster. In some configurations the method can include adjusting the upper portion of the thoracic bolster assembly laterally in a posterior and/or anterior direction and adjusting the upper portion of the pelvic bolster assembly laterally in a posterior and/or anterior direction.

Other aspects of the disclosed subject matter, as well as features and advantages of various aspects of the disclosed subject matter, should be apparent to those of ordinary skill in the art through consideration of the ensuing description, the accompanying drawings, and the appended claims.

BRIEF DESCRIPTION OF DRAWINGS

The following drawings illustrate what are currently considered to be specific representative configurations for carrying out the disclosed subject matter and are not limiting as to embodiments which may be made in accordance with this disclosure. The components in the drawings are not necessarily to scale relative to each other. Like reference numerals designate corresponding parts throughout the several views.

DETAILED DESCRIPTION

Figure 1:
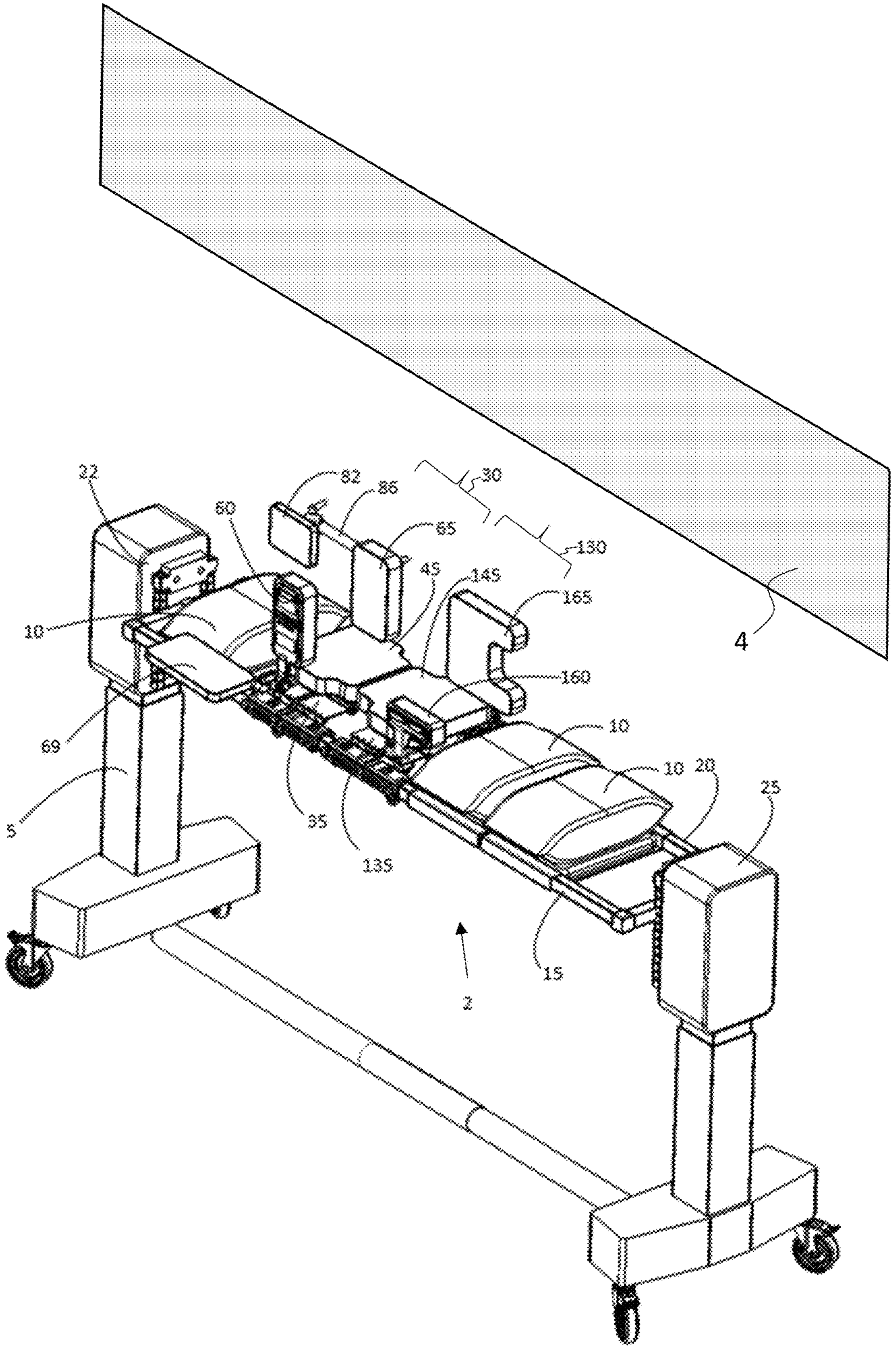
FIG. 1 is a perspective view of a surgical table with a patient positioning system according to the present disclosure secured to the surgical table.

This disclosure generally relates to a patient positioning system that may be used in spinal surgical procedures. One embodiment of the present disclosure is shown and described in a patient positioning system of FIG. 1. FIG. 1 shows the patient positioning system 2 positioned on opposing rails 15 and 20 of a surgical bed frame 5, such as a Jackson Table® or a Mizuho surgical table. Patient positioning system 2 generally includes a thoracic bolster assembly 30 and a pelvic bolster assembly 130.

Figure 2A:
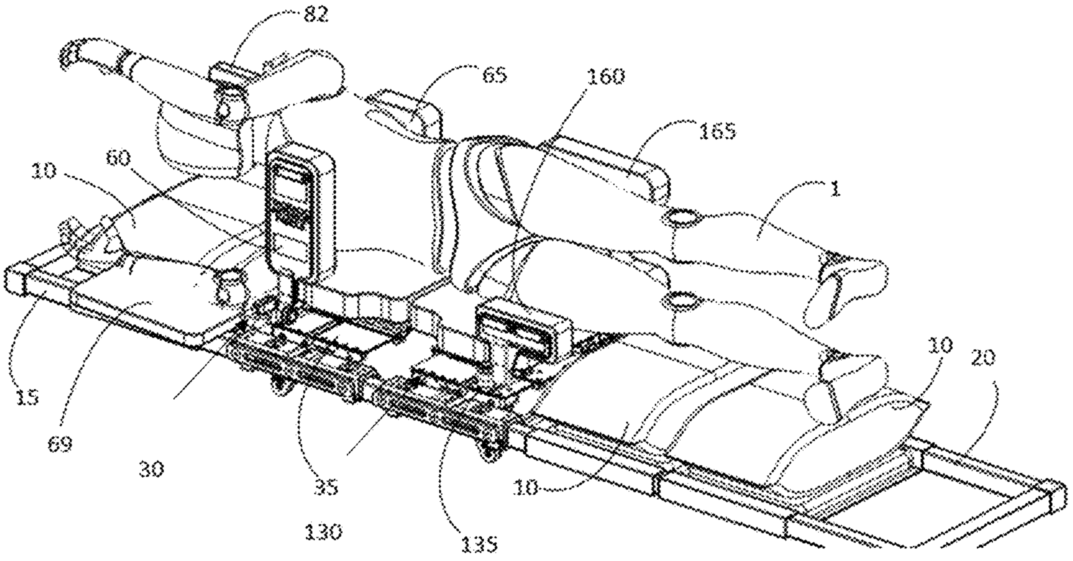
FIGS. 2*a*, 2*b*, and 2*c* are, respectively, a perspective front side view, a front view, and a rear view of the patient positioning system of FIG. 1 attached to a portion of the surgical table of FIG. 1 with an exemplary patient laying on its right side in the patient positioning system.
Figure 2B:
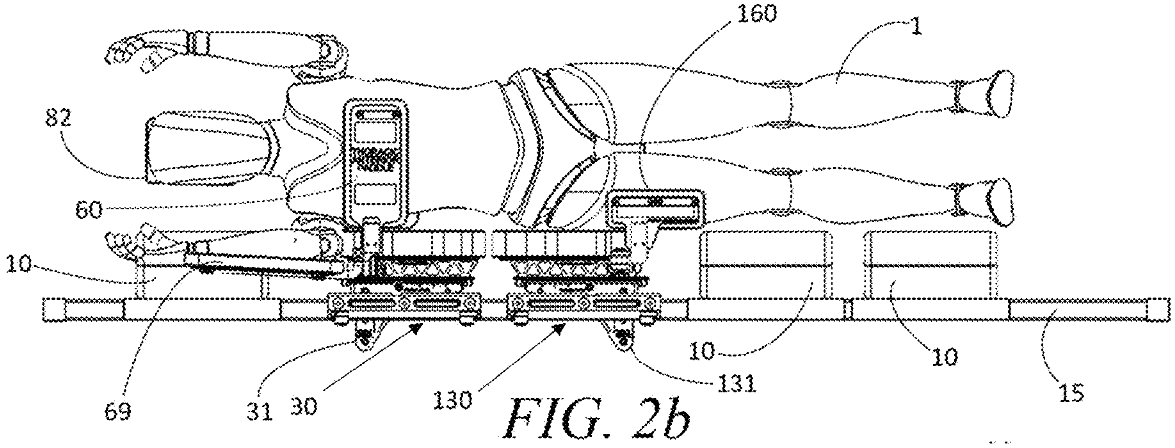
Figure 2C:
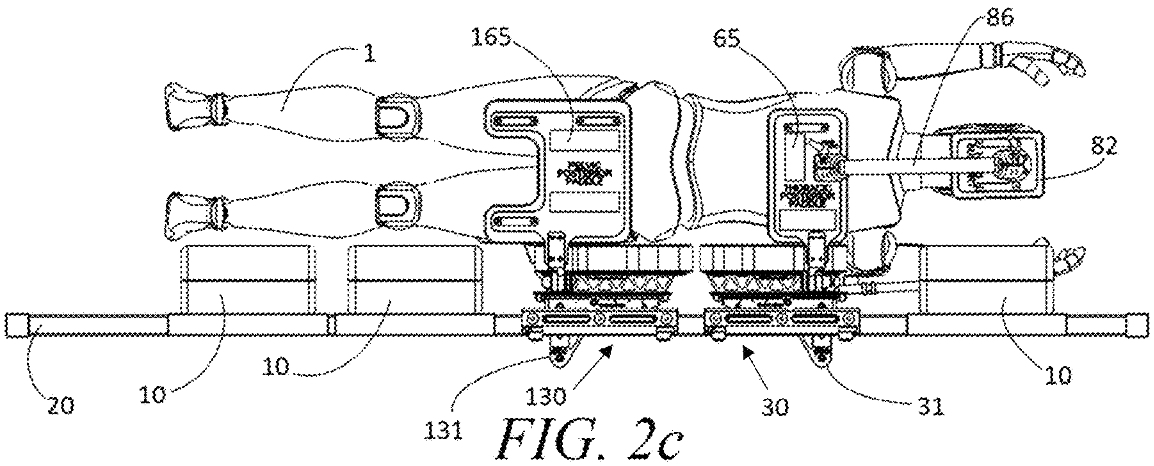

Each of the thoracic bolster assembly 30 and pelvic bolster assembly 130 may be more simply referred to as "bolster assembly 30" and "bolster assembly 130" or as "bolster assemblies 30 and 130." The pelvic bolster assembly 130 may support a portion of a pelvis of a patient, while the thoracic bolster assembly 30 may support a portion of a chest or thoracic region of a patient when the patient is in a lateral position, such as the lateral decubitus position. FIGS. 2*a*, 2*b*, and 2*c* show, respectively, a perspective front side view, front view, and rear view of the patient positioning system of FIG. 1 attached to a portion of the table of FIG. 1 with an exemplary patient laying on its right side in the patient positioning system. As described in more detail below, the system is configurable to allow a patient to lie on their left or right side.

Bolster assemblies 30 and 130 are removably secured to parallel bars or rails 15 and 20 of surgical bed frame 5. Parallel rails 15, 20 may extend from the superior or cranial end 22 of surgical bed frame 5 to the inferior or caudal end 25 of surgical bed frame 5. Rail couplers, as described in more detail below, are slidably mountable on opposing rails of a surgical bed frame allowing the bolster assemblies 30, 130 to be adjusted longitudinally along the opposing rails of the surgical bed frame. Bolster assemblies 30 and 130 may be positioned at any point along that distance though preferably in those positions that will provide the best support for a patient while allowing desirable surgical access to the patient's spine for a surgeon. According to some embodiments, cushions 10 may be positioned at various points along the rails 15, 20 of surgical bed frame 5.

Each of the thoracic bolster assembly 30 and pelvic bolster assembly 130 includes a base 35 and 135, respectively, an upper portion 45 and 145, respectively, in connection with the base 35 and 135, and a frame 48 and 148, respectively, to which is attached base 35 and 135, respectively. Each frame 48, 148 may be mountable onto parallel rails 15 and 20 of surgical frame bed 5. In some configurations, the upper portions 45, 145 are movable relative to the base 35, 135 in one, two, or more directions. Alternatively, the upper portion 45, 145 may be fixed relative to the base 35, 135 in one or two directions.

Figure 3A:
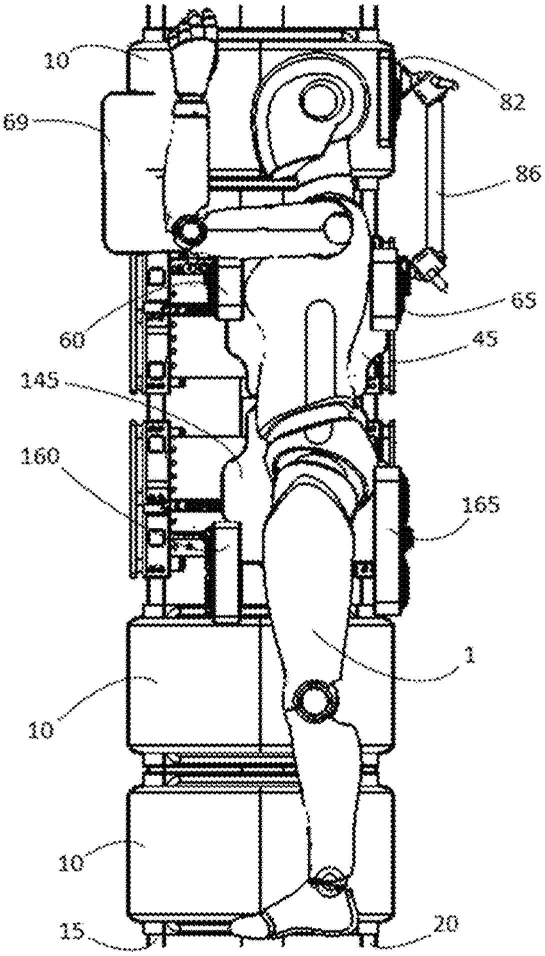
FIG. 3*a* is a top view of the patient positioning system of FIG. 1 with both the thoracic and pelvis bolster assemblies positioned posteriorly relative to the surgical table.
Figure 3B:
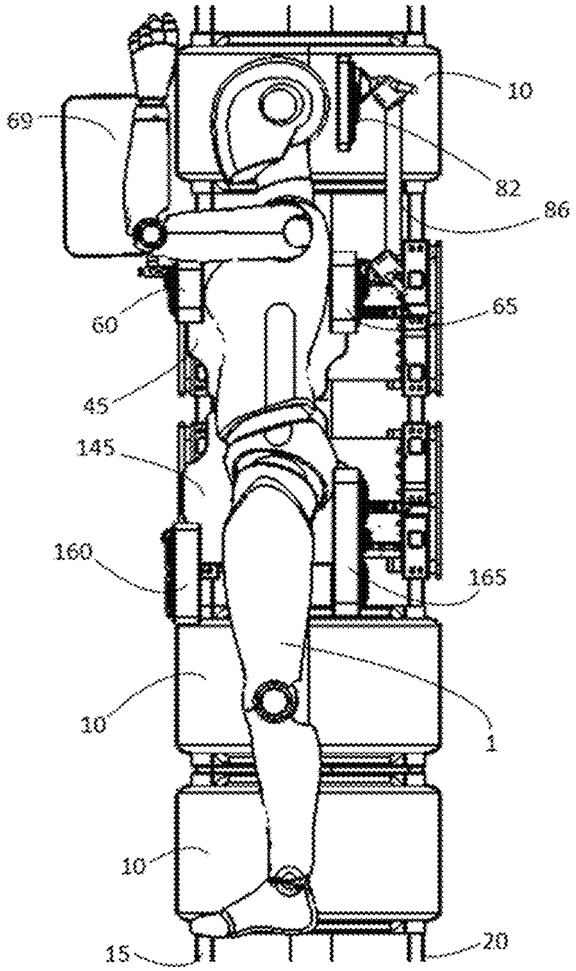
FIG. 3*b* is a top view of the patient positioning system of FIG. 1 with both the thoracic and pelvis bolster assemblies positioned anteriorly relative to the surgical table.

In configurations where the upper portion 45, 145 is adjustable relative to the base 35, 135, the upper portion 45, 145 may be movable in one plane relative to the base 35, 135: in a lateral plane for posterior/anterior adjustment. In configurations where the base 35, 135 is adjustable relative to the frame 48, 148, the base 35, 135 may be angularly adjustable in one plane relative to the frame 48, 148: in a coronal or sagittal plane to achieve lordosis and/or increase access to the lumbar spine. For example, the upper portion 45, 145 may be movable laterally with respect to the base 35, 135 and the surgical frame (as illustrated in FIGS. 3*a* and 3*b*). In other words, the upper portion 45 is adjustable in a posterior and/or anterior direction relative to the base.

Lateral or Posterior/Anterior Adjustment

With an upper portion 45, 145 that is adjustable relative to the base 35, 135, the surgeon is enabled to adjust the patient more posteriorly or anteriorly with respect to the surgical frame 5. Adjustment of the upper portion 45, 145 relative to the base 35, 135 allows a surgeon to position a patient closer or farther away from the surgeon as needed for access. For example, if the surgeon preferred to have access to the spine through the patient's stomach, the upper portions 45, 145 of the thoracic bolster assembly 30 and pelvic bolster assembly 130, respectively, could be moved anteriorly as shown in FIG. 3*b*. Then after an anterior approach to the spine is accomplished, the surgeon can move the bolsters posteriorly, as illustrated in FIG. 3*a*, to allow for a different approach to the spine from the lateral side or posterior of the patient.

Figure 4:
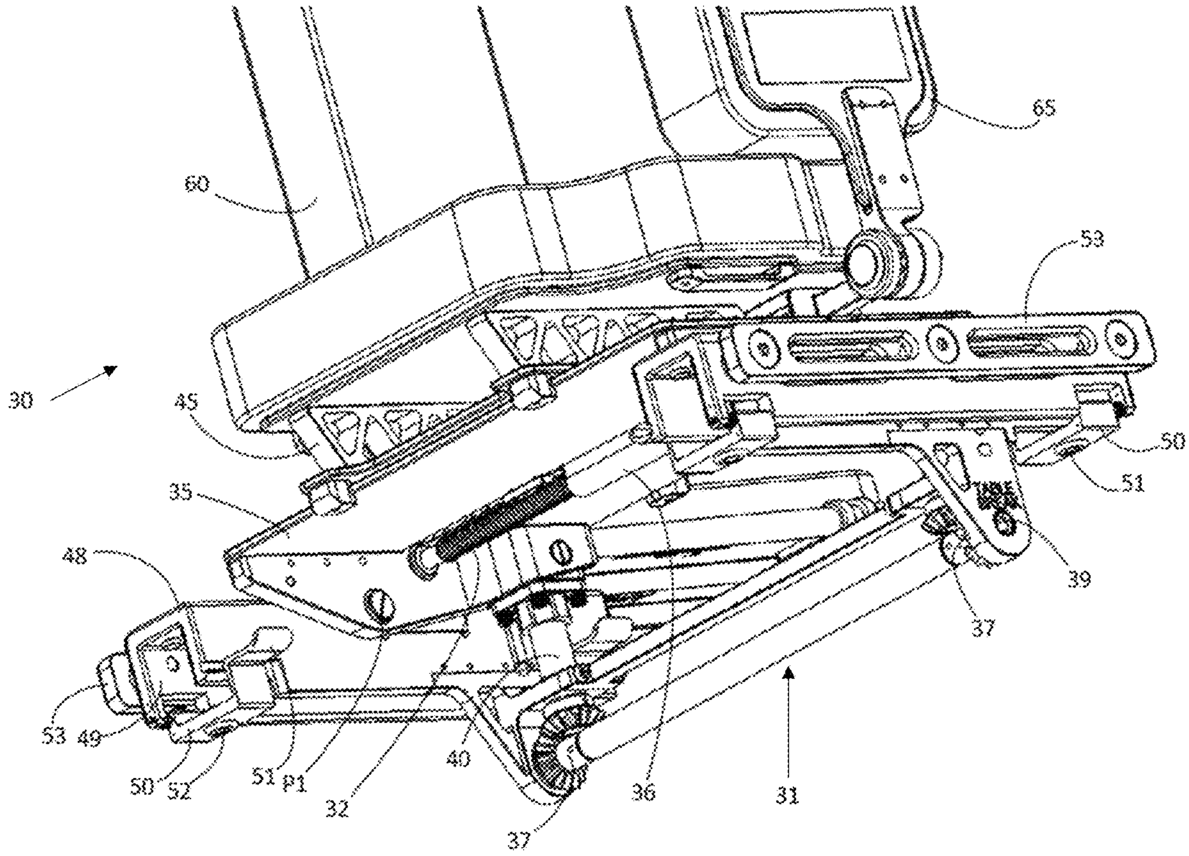
FIG. 4 is a perspective view of a thoracic bolster assembly of the patient positioning system of FIG. 1 illustrating the underside of the thoracic bolster assembly.
Figure 5:
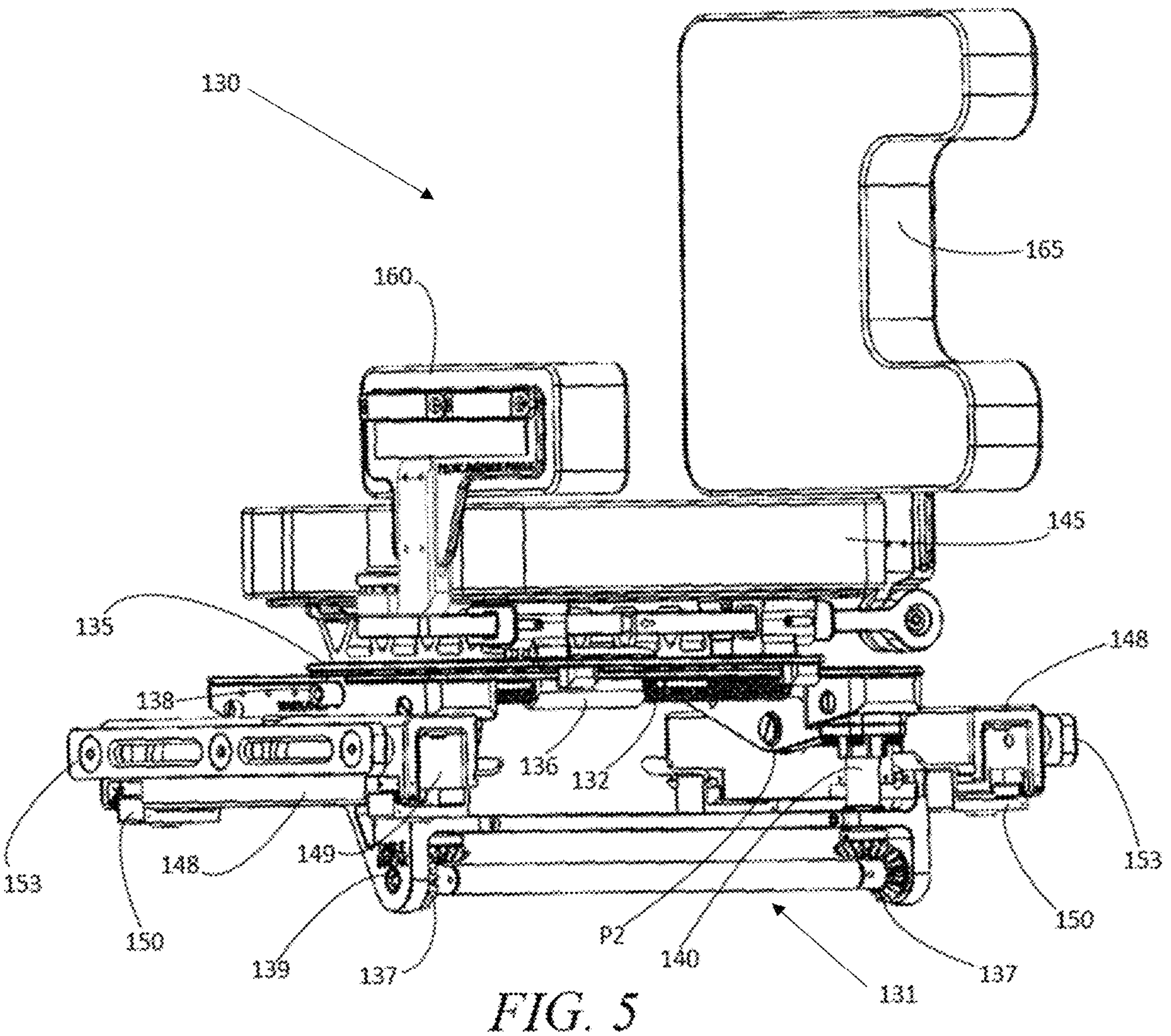
FIG. 5 is an angled front view of a pelvic bolster assembly of the patient positioning system of FIG. 1.

FIG. 4 shows a bottom side perspective view of a thoracic bolster assembly 30, and FIG. 5 shows a perspective front view of a pelvic bolster assembly 130. Several features of the thoracic bolster assembly 30 and pelvic bolster assembly 130 function similarly and will be described in conjunction. As shown in FIGS. 4-5, the upper portion 45, 145 of the bolster assemblies 30, 130 may be laterally moveable (i.e., posteriorly/anteriorly) relative to the base 35, 135 as described above by being mechanically engaged to the base via an adjustment bolt or screw 32, 132. Other types of connections, mountings, etc. may be used to connect upper portion 45, 145 to the base 35, 135 such that it may be movable relative to the base 35, 135. The upper portion 45, 145 in the configurations shown in FIGS. 4-5 is mechanically connected to the screw 32, 132 via a mounting bracket 36, 136 that may utilize a nut or threaded channel such that the mounting bracket is caused to move laterally either posteriorly or anteriorly when the screw 32, 132 is rotated.

As is visible in FIG. 5, a drive or socket 138 is included on one or both ends of the screw 132 of the pelvic bolster assembly 130 (a similar drive or socket may be provided on the screw 32 of the thoracic bolster assembly 30 but is not visible in FIG. 4). The drive 138 includes a square recess to allow a handled drive rod with a square boss to be inserted into the square recess of the drive 138 to turn the screw 132. This allows a surgeon or clinician to insert a drive rod with a handle into the drive 138, adjust the upper portion 145 posteriorly/anteriorly relative to the base 135, and then remove the rod. This may prevent any accidental movement of the screw 132 and also maximize space for access to the patient. Instead of providing a drive with a drive rod to be inserted, the drive rod and/or handle may be integral to the screw to be non-removable.

Coronal Plane Adjustment

In addition to the upper portion bolster assembly being adjustable in a posterior and/or anterior direction relative to the base, the upper portion and base may be adjustable in the coronal plane of the patient (coronal plane 4 illustrated in FIG. 1) to allow a surgeon to achieve a desired or specific lordosis or to provide greater access to the lumbar spine, depending on the type of surgery and the patient's spine. That is, the upper portion and base of the bolster assembly are moveable angularly in the coronal plane of the patient (i.e., twisting the patient's hips left and right relative to the patient, or up/down relative to the bed). When a patient is positioned laterally, this angular adjustment is in the coronal plane of the patient and may serve to create additional space in the spine for surgical access.

FIG. 4 illustrates that the frame 48 of the thoracic bolster assembly 30, which includes rail couplers 46 to connect the assembly 30 to the surgical rails 15 and 20, is attached to the base 35 of the thoracic bolster assembly 30 via an angular adjustment mechanism 31, which in this illustrated embodiment includes a gear mechanism that is rotated by a socket. Similarly, FIG. 5 illustrates that the frame 148 of the pelvic bolster assembly 130 is attached to the base 135 of the pelvic bolster assembly 130 via an angular adjustment mechanism 131. Frames 48, 148 are attached to a bracket to which is attached a geared shaft 37, 137 and a pair of gear shafts 40, 140, each of which engages on the gear end with the two gear ends of geared shaft 37, 137.

The bracket can also include a socket 39, 139 that, when rotated by a removable handle, rotates geared shaft 37, 137 that in turn rotates both gear shafts 40, 140, thereby adjusting the angle of base 35 in the coronal plane of the patient as base 35, 135 pivots about pivot point P1, P2. Any one of these various components in the angular adjustment mechanism 31, 131 may include a means for resisting rotation to limit or prevent undesirable tilting of base 35, 135.

Longitudinal Adjustment

In addition to the bolster assemblies themselves being adjustable in multiple directions, the bolster assemblies can also be adjusted longitudinally along the rails of the surgical bedframe. In some configurations, the base 35, 135 of the bolster assemblies 30, 130 includes means for attaching the bolster assemblies 30, 130 to rails of a surgical frame bed, such as the parallel rails 15 and 20 and surgical bed frame 5. For example, the rail couplers 46, 146 of frames 48, 148 are sized and shaped for receiving the parallel rails 15 and 20, respectively, of surgical frame bed 5, and may be provided on opposing sides of the base 35, 135. FIG. 4-5 shows the rail couplers of frame 48 with an open side 49 for simple and adjustable attachment to surgical bed rails 15 and 20. The rail couplers 46 of frame 48 may comprise any number of geometries or shapes that allow the base 35, 135 to be mounted onto rails of a surgical frame bed as shown in FIG. 1. In some configurations, the rail couplers of frames 48, 148 may be slidably connected to or mounted onto each of the rails 15, 20, to allow bolster assemblies 130, 30 to be longitudinally adjustable along the rails of the surgical bed frame 5 and allow for further unique adjustments based on the size of the patient and the access needs of the surgeon for the particular procedure.

In some embodiments, one or more fasteners or locking mechanisms may be provided on one or both of the opposing lateral sides to lock the rail couplers of frames 48, 148 to the rails 15, 20 of the surgical bed frame. For example, a locking mechanism may be provided that consists of a latch 50, 150 that has a closed position wherein the latch extends across the open side of the rail coupler of frames 48, 148 and connects to the inner side of the rail coupler 46, 146. Compared to a configuration in which the latch 50 extends from the inner side of the rail coupler 46, 146 to connect to the outer side of the rail coupler 46, 146, extending inwardly from the outer side of the rail coupler 46, 146 may reduce the ability of the latch 50, 150 to undesirably or accidentally catch on surgical sheets, cords, other equipment, or the clothing of any personnel.

The latch 50, 150 can include an outwardly extending lip which mates with a groove provided on the exterior side of the inner portion of the rail coupler. A release 51 can be provided on the inner side of the latch 50, 150, allowing a clinician to reach under the base 35 and pull downwardly on the release to release the latch 50, 150 manually. The latch can also include one or more gussets 52 formed of resilient material, such as rubber or any other suitable material. When the latch 50 is closed, it compresses gusset 52 against the rail of the surgical bed frame reducing slippage of the rail coupler relative to the rails of the surgical frame when the latch 50 is closed.

Although not illustrated, the base 35, 135 may include one or more straps to secure cords or cables to prevent them from interfering with the surgery. Such straps may be Velcro straps located at each lateral side of the base 35, 135, and each lateral side may include both caudal- and cephalad-positioned straps, which straps may be laced through two or more holes in the base 35, 135.

Adaptors 53, 153, also known as bed rails, are mounted to the rail couplers of frames 48, 148 of the thoracic assembly 30 and/or pelvic assembly 130 to allow a user to attach various instruments such as one or more A-arms, arm boards, etc., to the surgical bed frame 5. Adaptors 53, 153 are attached to the lateral sides of each of the rail couplers. Adaptors 53, 153 may provide a convenient method for a clinician to attach table-mounted surgical accessories, such as retractors, A-arms, robotic equipment, etc. Instead of being mounted on both rail couplers, an adaptor 53, 153 may be mounted on only one rail coupler. Alternatively, the adaptors 53, 153 could be mounted on another portion of the base 35, 135 of the bolster assembly 30, 130. As another alternative, adaptors 53, 153 may be provided in a plurality of different locations and configurations of one or more of the bolster assemblies 30, 130. Or adaptors(s) 53, 153 may not be provided. Instead of adaptor(s), one or more Clark sockets may be provided attached to one or more of the lateral sides of the base 35, 135 of one or more of the bolster assemblies 30, 130. Clark sockets may be attached either directly to the lateral sides or may be attached to the adaptors 53, 153.

Bolster Adjustment of the Thoracic Assembly

Figure 6:
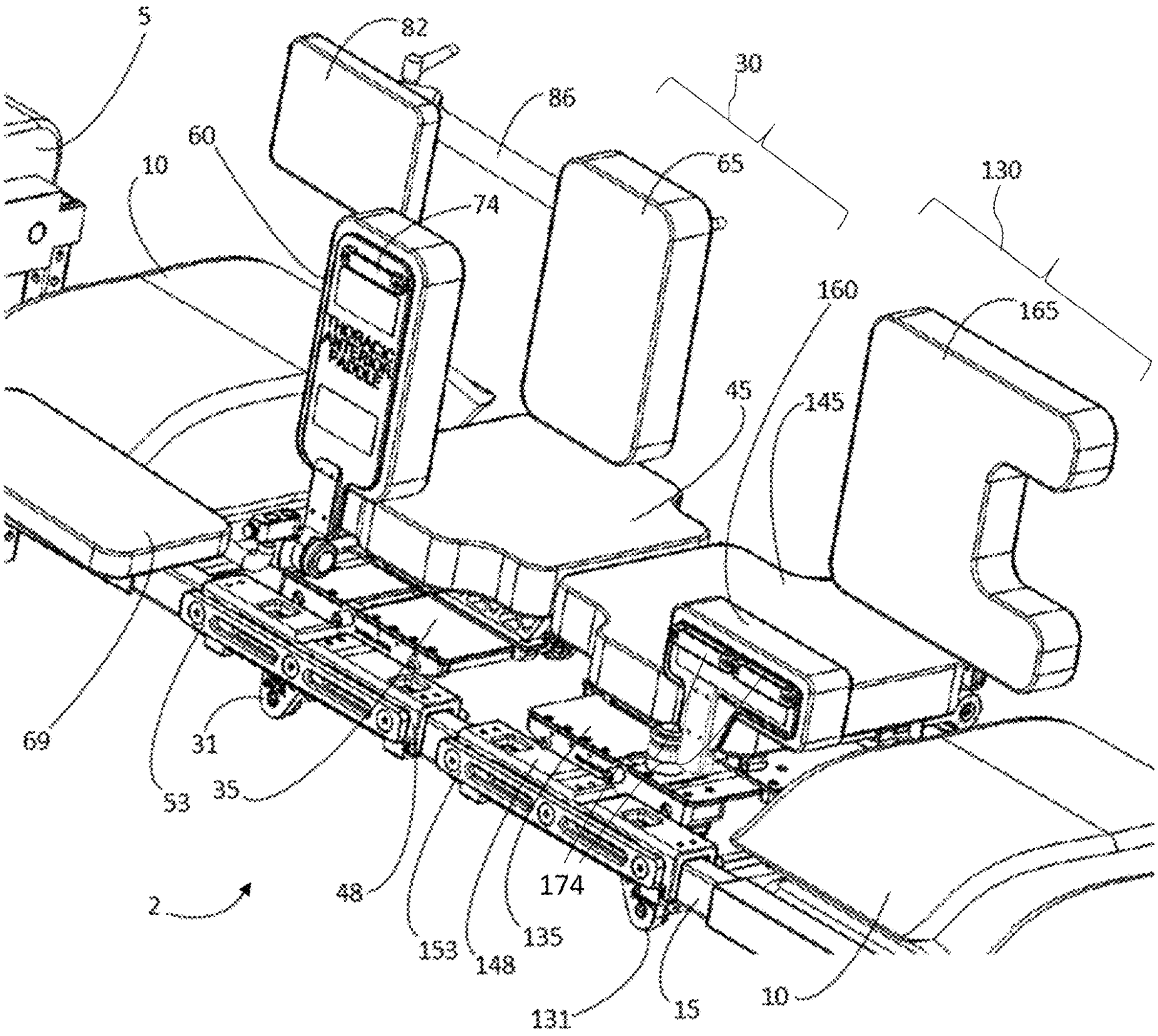
FIG. 6 is an enlarged view of one side of the patient positioning system of FIG. 1.
Figure 7:
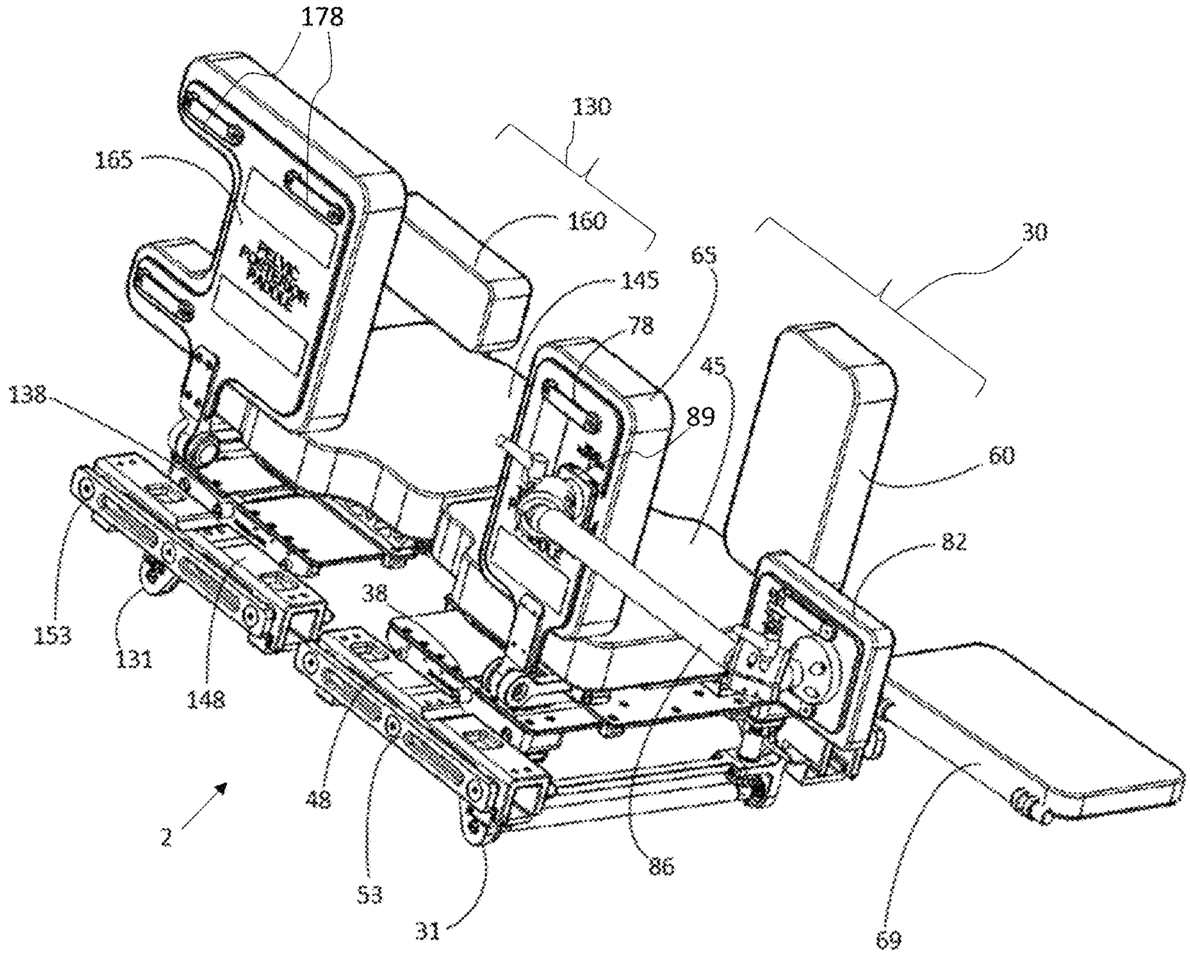
FIG. 7 is a rear perspective view of the patient positioning system of FIG. 1 separated from the surgical table.

In addition to allowing adjustments between the base and the upper portion of the bolster assemblies, the bolster assemblies can also allow for various configurations of paddles attached to the assemblies. FIGS. 4 and 6-7 illustrate a thoracic anterior paddle 60 and a thoracic posterior paddle 65 attached to the upper portion 45 of the thoracic assembly 30. The anterior paddle 60 supports an anterior portion of the patient's chest while positioned on the thoracic bolster assembly 30, and the posterior paddle 65 supports the patient's posterior thoracic region. With the paddles attached to the upper portion 45 of the thoracic assembly 30, the paddles adjust with the upper portion 45 as the upper portion 45 is moved relative to the base 35. Instead of being connected to the upper portion 45, the paddles could be connected or mounted on another portion of the thoracic assembly, such as directly to the base 35 or the frame 48. The size and geometry of the bolsters can also be changed as desired to achieve the desired support for the patient.

Both anterior paddle 60 and posterior paddle 65 may be adjusted at multiple points based on the unique needs of the particular patient and the particular access needed by the surgeon. In some configurations, one or more of the anterior paddle 60 and/or the posterior paddle 65 includes one or more hinges. For example, a locking hinge may be adjustable inwardly and outwardly to adjust for the varying patient size. These hinges, along with any strap system used in conjunction with the paddles, may also be used to vary the amount of lateral compression by the bolsters 60, 65 on the patient. The hinges may also allow anterior paddle 60 and/or posterior paddle 65 to be positioned substantially horizontally to facilitate loading of a patient onto thoracic bolster assembly 30.

Paddles 60, 65, may also be capable of rotating cranially and/or caudally, etc. Locking hinge mechanisms may be used, and/or indexed locking hinge mechanisms may be used to allow for adjustment to various indexed positions. In other configurations, there may be fewer hinges provided and fewer degrees of rotation.

Figure 10:
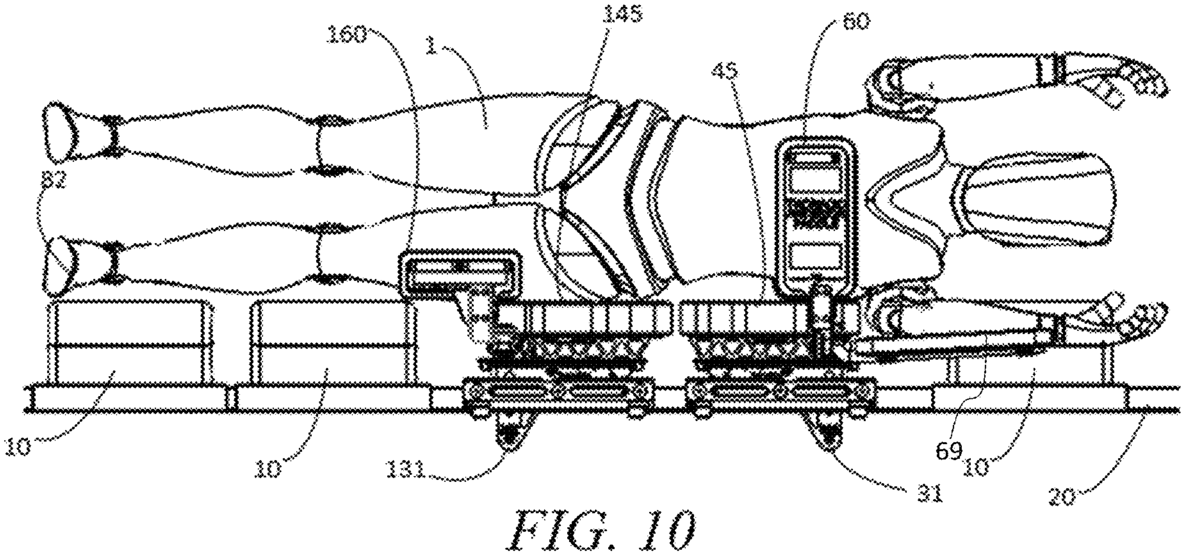
FIG. 10 is a frontal view of another embodiment of a patient positioning system where the various bolsters are positioned on the thoracic and pelvic bolster assemblies, respectively, to position the patient on its left side.

In addition to rotating in the axial and/or coronal planes of the patient, paddles 60, 65, may also be adjustable in the sagittal plane of the patient (i.e., inwardly towards the patient and outwardly away from the patient). In one configuration, the hinge connection of one or both paddles 60, 65 includes a shaft that inserts into a receiver. The shaft is slidably adjustable relative to the receiver to provide greater customization depending on patient size and surgeon preference. This configuration also allows paddles 60, 65 to be (1) installed after the patient has been loaded onto thoracic bolster assembly 30 prior to surgery; (2) removed prior to removing the patient from thoracic bolster assembly 30 after surgery; and (3) removably connected to either of the opposing sides of the surgical bed frame so the patient can face either of the opposing sides of the surgical bed frame (see FIG. 10, with the patient lying on their left side).

Anterior paddle 60 can include a lower arm support 69, which may be secured to the anterior paddle 60, the upper portion 45, and/or the base 35. Lower arm support 69 has a first, longitudinal position to support a lower arm that is in a 90-degree position (see FIGS. 8*a*-8*c*), and a second, lateral position to support a lower arm that is in an extended position (not shown). The lower arm support 69 may also be adjusted to other positions depending on the surgeon's desired arm position for the patient for desired surgical access. In some embodiments, lower arm support 69 is rotatable between a 90-degree position and a 0-degree position with the ability to lock lower arm support 69 at any number of positions therebetween. A pillow or bolster (not shown for clarity) is typically placed above the patient's lower arm to support the upper arm. In some embodiments, the anterior paddle 60 does not include a lower arm support.

A first strap brace 74 is included on the anterior paddle 60 (see FIG. 6), and a second strap brace 78 is included on the posterior paddle 65 (see FIG. 7). A strap (not shown) can be threaded through the first strap brace 74, across the patient's body proximal to their axilla or armpit, and threaded through the second strap brace 78. In other configurations, the strap may be permanently secured to one of the anterior or posterior bolsters. Any suitable material may be used for the strap, such as nylon, etc. Providing strap braces and a strap may reduce and/or eliminate the need to use tape to assist in positioning and retaining the patient within the patient positioning system 2. In some embodiments, the strap extends from one bolster around the patient, around the entire bed, and is secured to the original bolster. In other embodiments, the strap extends from a first bolster, loops through a D-ring or similar structure on the second bolster, and is secured to the first bolster. Such a configuration allows a user to secure the strap over the patient from one side of the bed.

The posterior paddle 65 may be adjustable in multiple planes, similar to the anterior paddle 60 (inwardly and outwardly, cranially and caudally, etc.). Posterior paddle 65 may be shaped as shown in FIGS. 6 and 7, though other shapes or geometries may be used, such as a general U-shape or horseshoe shape. Such variable shapes may physically and radiographically open the thoracic and/or cervical spine, allowing for an unobstructed view of this area which may be desirable for imaging and/or access during spinal surgery.

Posterior paddle 65 includes a head support 82. Head support 82 is connected to the posterior paddle 65 via one or more adjustable arms 86 to allow for customizable positioning of the head support 82 for each patient. Arm 86 may be connected to the posterior paddle 65 via a dovetail hinge 89. This allows the head support 82 to be easily removed and replaced by lifting the arm 86 vertically. The head support 82 can be connected to the posterior paddle in other ways, or made integral to the posterior paddle, or in other configurations a head support 82 may not be included.

Bolsters and paddles may include one or more pads or cushions attached thereto. Pads are formed of a deformable material, such as resilient foam, etc. In some configurations, pads have a sterilizable surface and may be cleaned and reused. In other configurations the pads may be disposable. In other configurations the pads may be configured to receive a disposable pad cover. Pads may be attached, for example, via hook and loop fastener, to the bolsters and/or paddles. Any of the bolsters and/or paddles discussed herein may be designed to achieve an overhang of each respective pad relative to whatever surface supports the pad. Such an overhang reduces contact between a patient and any non-padded surfaces of the patient positioning system 2. The overhang may be anywhere from about 0.5 cm to about 5 cm, from about 1 cm to about 4 cm, or from about 1.5 cm to about 3 cm.

Bolster Adjustment of the Pelvic Assembly

FIGS. 5-7 illustrate the pelvic bolster assembly 130. The pelvic bolster assembly 130 has some similar structures to the thoracic bolster assembly 30 as discussed above. For example, a base 135 with an upper portion 145 in connection with the base 135, the upper portion 145 movable relative to the base 135 via an angular adjustment mechanism 131 (visible in FIG. 5).

The pelvic bolster assembly 130 may have an upper portion 145 that is laterally adjustable relative to the base 135. With a patient in a lateral position, this allows the surgeon to adjust the patient more posteriorly or anteriorly with respect to the surgical frame. Adjustment of the upper portion 145 relative to the base 135 allows a surgeon to position a patient closer or farther away from them as needed for access. As discussed above, the upper portion 145 can be moveable relative to the base 135 by being mechanically connected to a bolt, drive shaft, or screw 132 of the base 135, the screw 132 including a drive or socket 138 to allow for adjustment. This allows a surgeon or clinician to insert a drive rod with a handle into the drive 138, adjust the upper portion 145 relative to the base 135, and then remove the rod.

Similar to the thoracic bolster assembly 30, the frame 148 of the pelvic bolster assembly 130 includes means, such as rail couplers 146, for attaching the pelvic bolster assembly 30 to parallel rails 15, 20 of the surgical frame bed 5 and allowing the pelvic bolster assembly 130 to be moved longitudinally along the rails. And similar to the thoracic bolster assembly 30, one or more adapters 153 may be provided on the pelvic bolster assembly 130.

Similar to the configuration of the thoracic bolster assembly 30, the configuration of the pelvic bolster assembly 130 is adjustable in two planes. In addition to adjustment in the lateral direction (parallel to the sagittal plane of the patient, or posteriorly/anteriorly) as described above, the pelvic bolster assembly 130 is also adjustable in a downward direction, or, in other words, angularly with respect to the sagittal plane of the patient. When a patient is positioned laterally, this downward adjustment is in the coronal plane of the patient and may serve to create additional space in the spine for surgical access.

FIG. 5 illustrates that the rail couplers 146 of frame 148 of the pelvic bolster assembly, which connect the pelvic bolster assembly 130 via rails 15, 20 to the surgical frame 5, are attached to the base 135 of the pelvic bolster assembly 130 via an angular adjustment mechanism 131 as discussed above.

In some embodiments, the base 135 of the pelvic bolster assembly 130 is adjustable relative to the frame 148 through any number of other suitable means. For example, any type of gear may be used. Gears that are non-back drivable, such as worm gears, may be preferred. Other drive mechanisms and/or linkages may be provided such as leadscrew/nut mechanism, rack and pinion, a hypoid, a spiral bevel gear, or another gear driven mechanism could be used in place of a worm drive. In some embodiments, the mechanism is manually operated, though in some embodiments, the mechanism is driven by an electric motor, which can be controlled with the push of a button or other actuator proximal to the patient and/or bolster assemblies or from a remote device.

The upper portion 145 of the base 135 may also have one or more lateral paddles attached thereto. Pelvic anterior paddle 160 and posterior paddle 165 may have features similar to the features described above with respect to the thoracic anterior paddle 60 and posterior paddle 65. For example, they may be adjustable inwardly/outwardly to adjust lateral compression on the patient, as well as cranially/caudally. One or more strap braces 174 (FIG. 6), 178 (FIG. 7) may be provided to place one or more straps across the patient's body from the anterior paddle 160 to the posterior paddle 165.

Posterior paddle 165 may include a thigh support (not illustrated). A thigh support may be generally curved or L-shaped to support a patient from the lateral side of their top-positioned thigh to an anterior side of their top-positioned thigh. A thigh support would support the anterior side of the patient's thigh of their top-positioned leg, while anterior paddle 160 supports the anterior side of the patient's thigh of their lower-positioned leg. A pillow or bolster is typically placed below the patient's legs to support them in the correct position. Or a pillow may not be used depending on the desired angle for the patient's legs. A thigh support, which may be secured to posterior paddle 165 via a slidable shaft extending from the thigh support and received by posterior paddle, which allows the thigh support to be adjustable both upwardly/downwardly and outwardly/inwardly relative to the posterior paddle 165 to allow for ideal fit for patients of different sizes.

Anterior paddle 160 and posterior paddle 165 (optional and an thigh support) may all have pads attached thereto. For example, Velcro® or hook and loop fasteners may be applied to the surface of one or more of the anterior paddle 160 and posterior paddle 165 (and/or a thigh support). Pads to be attached may similarly include Velcro®.

The connection of the thigh support to the posterior paddle 165 is symmetrical, such that the posterior paddle 165 along with a thigh support could be placed on either side of the surgical table and function equivalently on both sides. Posterior paddle 165 may include a pad having an arcuate or semi-circular cutout to accommodate the connector to the thigh support in the middle of the pad. Both the left and right sides of the posterior bolster 165 include velcro to allow such a pad to be attached to either side.

Methods for Patient Loading

Posterior and/or anterior paddles may be completely removable from the upper portions 45, 145 of the support assembly to make it easier to place the patient on the bolster assemblies. For example, one or more posterior and/or anterior paddles may be entirely removed, the patient placed on the bolster assemblies, and then the posterior and/or anterior paddles locked back into place on the upper portions 45, 145 of the bolster assembly. Or the posterior/anterior paddles may be non-removable, and may be rotated down or out of the way to place the patient onto the bolster assemblies.

According to one aspect, the mechanism that allows for the removal of posterior and anterior paddles also allows each paddle to be positioned closer to or farther away from upper portions 45, 145. The mechanism includes a shaft extending from each of the posterior and anterior paddles that is received by a corresponding housing on upper portions 45, 145. The housing secures the shaft at any number of insertion depths.

Figure 8A:
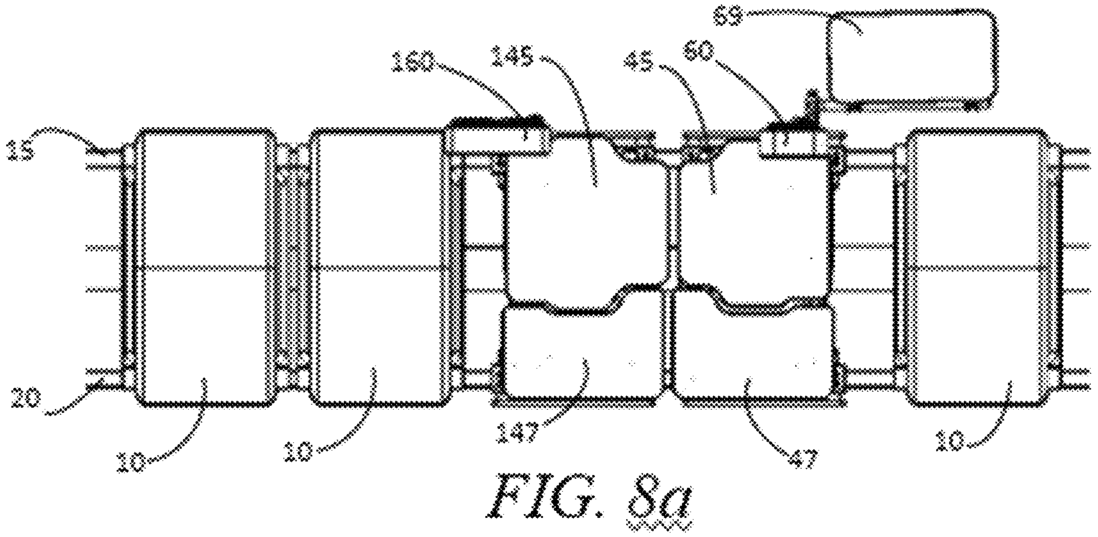
FIG. 8*a* is a top view of the patient positioning system of FIG. 1 with some paddles removed and loading bolsters added for ease of patient loading into the patient positioning system.
Figure 8B:
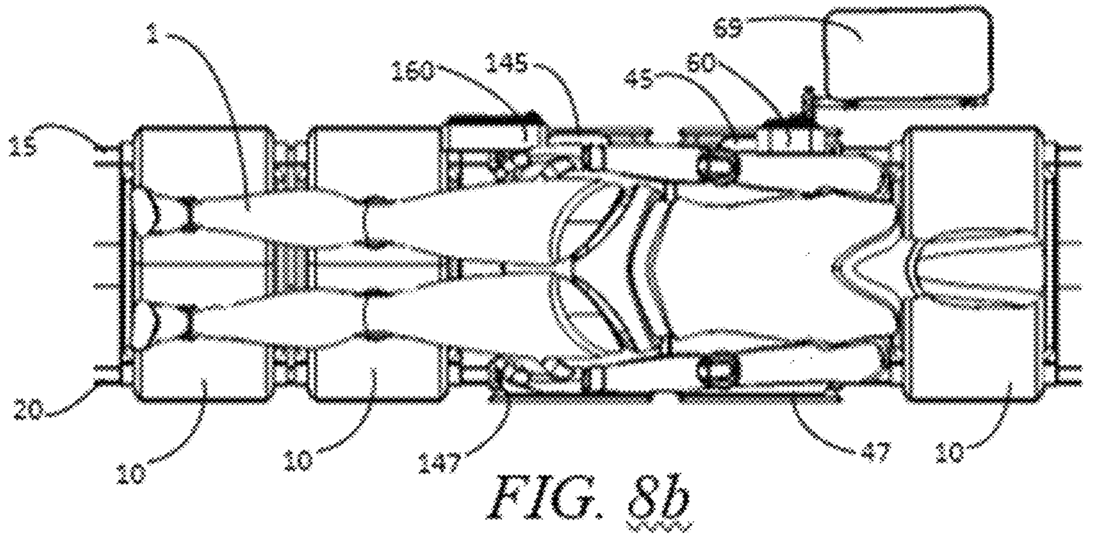
FIG. 8*b* is a top view of the patient positioning system of FIG. 7*a* with a patient loaded in a supine position.
Figure 8C:
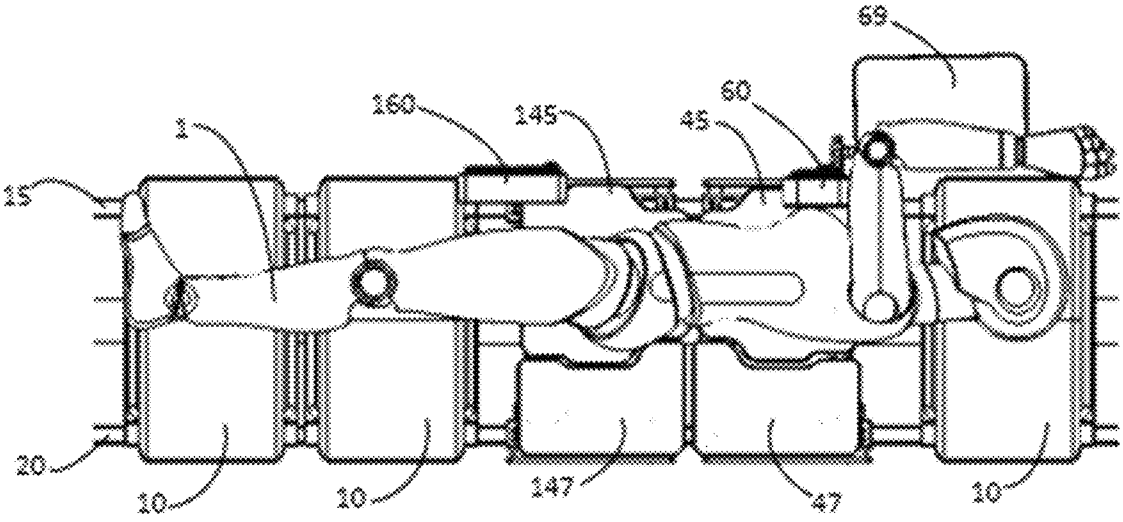
FIG. 8*c* is a top view of the patient positioning system of FIG. 7*a* with the patient rotated onto its right side.

One method of loading a patient onto a lateral patient positioning system includes one or more loading bolsters (FIGS. 8*a*-8*c*) that can be placed onto the positioning system 2 for patient loading, and then removed once the patient is in the lateral position. FIG. 8*a* shows a patient positioning system 2 with a thoracic bolster assembly loading bolster 47, and a pelvic bolster assembly loading bolster 147. These loading bolsters 47, 147, effectively increase the surface area of the bolster assemblies 30, 130 and allow enough space for a patient to be loaded onto the bolster assemblies 30, 130 in a supine position (FIG. 8*b*).

Before the patient is loaded onto the bolster assemblies 30, 130, the surgeon may first adjust the position of the bolster assemblies 30, 130 longitudinally along the rails 15, 20, according to the size of the patient. With the loading bolsters 47, 147 in place, a patient can be placed in a supine position over the thoracic bolster assembly and the pelvic bolster assembly (FIG. 8*b*). For example, the patient could in a supine position on a stretcher or gurney, with the stretcher or gurney placed immediately adjacent to the patient positioning system 2. The patient could be transferred to the patient positioning system 2 in the supine position (and over the loading bolsters 47, 147).

Once the patient is on the patient positioning system 2, the patient can then be rotated from the supine position to a lateral position, away from or off of the thoracic bolster assembly loading bolster 47 and the pelvic bolster assembly loading bolster 147. With the patient in the lateral position, the loading bolsters 47, 147 can be removed from the bolster assemblies. After lateral paddles have been secured to the thoracic and pelvic bolsters, straps can then be secured to the bolsters and/or paddles to keep the patient in place.

Figure 9:
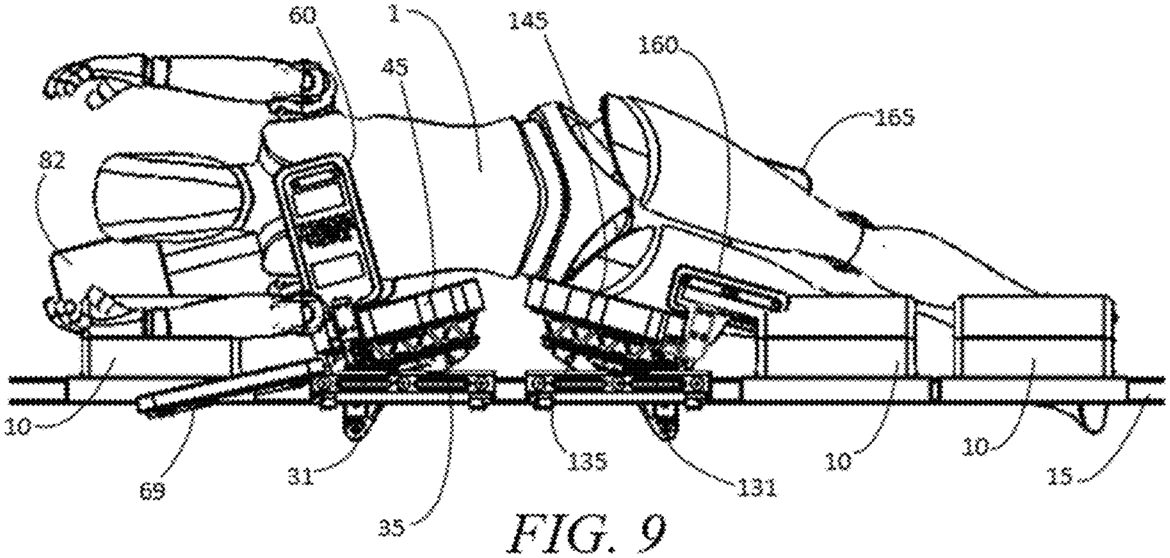
FIG. 9 is a front view of the patient positioning system of FIG. 1 with both the thoracic and pelvic bolster assemblies broken or moved in a coronal plane to induce a lateral curvature to the patient's spine and/or to achieve greater access to the lumbar spine.

The surgeon can then adjust the upper portion of the bolster assemblies as desired (i.e., anteriorly/posteriorly as illustrated in FIGS. 3*a*-3*b*, and/or in a coronal plane as illustrated in FIG. 9). Additionally, one or more lateral paddles on the bolster assemblies can be adjusted to achieve the desired patient positioning.

According to another aspect, each of the bolster assemblies 30, 130 may have adjustable lengths. Although not illustrated, one or both bolster assemblies 30, 130 may be formed of two sliding plates. In this manner, the two plates allow for the height or length of the bolster assemblies 30, 130 to be adjusted as needed depending on a surgeon's needs and the size of the patient.

According to another aspect, one or more components of the patient positioning system may be formed of a radiolucent material, such as carbon fiber and polymer materials that are not only radiolucent but may also reduce the weight of the patient positioning system, thereby making the system easier to install, remove, and/or manipulate. Using radiolucent components may allow x-rays to be taken intraoperatively without components of the patient positioning system blocking the patient in the x-ray image.

In some embodiments, radiolucent materials are combined with radiopaque materials where the improved strength of the radiopaque material is desired. For example, in some embodiments, a worm wheel includes a metal insert to provide teeth that are sufficiently strong. In some embodiments, the location of the radiopaque materials is selected to minimize the impact such materials have on x-ray images.

According to another aspect of the present disclosure, the component parts of a patient positioning system may be replaceable. For example, stress on certain components may cause uneven wear over time or even failure of one or more of the components. In some embodiments, one or more of the worm shaft or worm gear may be replaced without the need to replace the entire patient positioning system 2. Similarly, in some embodiments, covers may be provided for one or more of the pads on the anterior and posterior supports. Such covers may be disposable, one-time use covers, or washable, re-useable covers. In some embodiments, one or more of the pads are replaceable and may be releasably secured to the patient positioning system by an attachment means, such as Velcro®. Cushions 10 may be replaceable and/or disposable.

According to another aspect, the patient positioning system may be adjusted while the patient is on the support structure or when the support structure is supporting the weight of the patient. That is, the patient positioning system may be adjusted intraoperatively. The positioning system may also be adjusted without a patient on the positioning system.

As an example of a patient support technique, a patient may first be placed in a lateral position, with the chest of the patient supported substantially by the thoracic bolster assembly 30. Similarly, the pelvis of the patient may be supported substantially by the pelvic bolster assembly 130. The clinician may adjust the position of one or more of the anterior and/or posterior thoracic and/or pelvic bolster assemblies to accommodate the size of the patient and the desired positioning. For example, the arm support 69 may be placed in the desired position, and the thigh support may be adjusted as desired to support the patient and may vary depending on the size of the patient.

After the bolster assemblies are adjusted as desired, a clinician may further secure the patient using one or more strap(s) attached to one or more of the strap braces. A strap may be placed proximal to the patient's axilla or armpit, from the posterior paddle 65 to the anterior paddle 60 of the thoracic bolster assembly and secured to the strap braces. Similarly, a strap may be placed on the anterior side of the patient's thighs, from the thigh support to the anterior paddle 160.

After placing the patient in the lateral position on the bolster assemblies 130, 30, a clinician may then adjust the bolster assemblies 130, 30, as needed.

Other methods of adjustment may also be used. Adjustment may be with one or both of the pelvic and thoracic assemblies 130, 30. After a patient is secured, a surgical frame may be rotated about a longitudinal axis. This may further improve access to the spine of the patient for surgical procedures. According to another aspect, the patient positioning system may also provide options for translational movement of the patient. The translational movement may be distinct and independent of the rotational movement of the patient in the coronal plane.

EMBODIMENTS

The following embodiments are provided as examples only of specific configurations, materials, arrangements, etc. contemplated by the authors of this disclosure:

Embodiment 1: A patient positioning system, comprising:

a thoracic bolster assembly comprising:

a frame, a base, and an upper portion, the base in connection with the frame via an angular adjustment mechanism to adjust the base in a coronal plane, the frame comprising a first rail coupler on a first anterior side and a second rail coupler on an opposing posterior side, the first and second rail couplers slidably mountable on opposing rails of a surgical bed frame allowing the thoracic bolster assembly to be adjusted longitudinally along the opposing rails of the surgical bed frame;

wherein the upper portion of the thoracic bolster assembly is coupled to the base and is further adjustable in a posterior and/or anterior direction relative to the base;

a thoracic anterior paddle attached to a first anterior side of the upper portion to support a patient's chest and a thoracic posterior paddle attached to a second posterior side of the upper portion to support a posterior portion of the patient;

a pelvic bolster assembly comprising:

a frame, a base, and an upper portion, the base in connection with the frame via an angular adjustment mechanism to cause movement of the base in a coronal plane, the frame comprising a first rail coupler on a first anterior side and a second rail coupler on an opposing posterior side, the first and second rail couplers slidably mountable on opposing rails of a surgical bed frame allowing the thoracic bolster assembly to be adjusted longitudinally along the opposing rails of the surgical bed frame;

wherein the upper portion of the thoracic bolster assembly is further adjustable in a posterior and/or anterior direction relative to the base;

a pelvic anterior paddle attached to a first anterior side of the upper portion to support the patient's anterior pelvis and a pelvic posterior paddle attached to a second posterior side of the upper portion to support the patient's posterior pelvis.

Embodiment 2: The patient positioning system of embodiment 1, wherein at least one of the thoracic anterior paddle, thoracic posterior paddle, pelvic anterior paddle, and pelvic posterior paddle is removable.

Embodiment 3: The patient positioning system of embodiment 1 or 2, further comprising a lower arm support attachable to the first anterior side of the upper portion of the thoracic bolster assembly.

Embodiment 4: The patient positioning system of embodiment 3, wherein the lower arm support is adjustable between a first, laterally extended position and a second, longitudinally extended position.

Embodiment 5: The patient positioning system of any one of embodiment 1, 2, 3, or 4, wherein the thoracic bolster assembly further comprises a head support coupled to the thoracic posterior paddle.

Embodiment 6: The patient positioning system of embodiment 5, wherein the head support is coupled to the thoracic posterior paddle via an adjustable arm.

Embodiment 7: The patient positioning system of embodiment 6, wherein the adjustable arm is connected to the thoracic posterior paddle via a dovetail hinge on a top side of the thoracic posterior paddle, such that the adjustable arm may be installed and removed through a vertical motion.

Embodiment 8: The patient positioning system of any one of embodiment 1, 2, 3, 4, 5, 6, or 7, wherein the angular adjustment mechanism is a leadscrew/nut, gear drive, a worm gear, rack and pinion, or hypoid.

Embodiment 9: The patient positioning system of any one of embodiment 1, 2, 3, 4, 5, 6, 7, or 8, wherein the first rail coupler and second rail coupler include a channel for receiving one of the opposing rails of the surgical bed frame.

Embodiment 10: The patient positioning system of any one of embodiment 1, 2, 3, 4, 5, 6, 7, 8, or 9, wherein at least one of the thoracic anterior paddle, lower arm support, and thoracic posterior paddle further comprises a deformable pad removably attached thereto.

Embodiment 11: The patient positioning system of any one of embodiment 1, 2, 3, 4, 5, 6, 7, 8, 9, or 10, wherein at least one upper portion is connected to its base via a screw and nut, and wherein the screw comprises a drive having a recess formed therein, the patient positioning system further comprising a handle with a boss for insertion into the recess of the screw to turn the screw and move the at least one upper portion relative to its base in a posterior and/or anterior direction.

Embodiment 12: The patient positioning system of any one of embodiment 1, 2, 3, 4, 5, 6, 7, 8, 9, 10, or 11, wherein the pelvic posterior bolster further comprises a thigh support.

Embodiment 13: The patient positioning system of embodiment 12, wherein the thigh support is adjustable in the coronal plane and a sagittal plane.

Embodiment 14: The patient positioning system of any one of embodiment 1, 2, 3, 4, 5, 6, 7, 8, 9, 10, 11, 12, or 13, wherein the thoracic anterior paddle and the thoracic posterior paddle are adjustable in the coronal plane and a sagittal plane.

Embodiment 15: The patient positioning system of any one of embodiment 1, 2, 3, 4, 5, 6, 7, 8, 9, 10, 11, 12, 13, or 14, wherein the pelvic anterior paddle and the pelvic posterior paddle are adjustable in the coronal plane and a sagittal plane.

Embodiment 16: A patient positioning system, comprising:

a thoracic bolster assembly comprising:

a frame connected to a base connected to an upper portion, the frame comprising a first rail coupler on a first anterior side and a second rail coupler on an opposing posterior side, the first and second rail couplers slidably mountable on opposing rails of a surgical bed frame allowing the thoracic bolster assembly to be adjusted longitudinally along opposing rails of a surgical bed frame;

wherein the upper portion of the thoracic bolster assembly is further adjustable in a posterior and/or anterior direction relative to the base;

a thoracic anterior paddle attached to a first anterior side of the upper portion to support a patient's chest and a posterior paddle attached to a second posterior side of the upper portion to support a posterior portion of a patient's head and shoulders;

a pelvic bolster assembly comprising:

a frame, a base, and an upper portion, the base in connection with the frame via an angular adjustment mechanism to cause movement of the base in a coronal plane, the frame comprising a first rail coupler on a first anterior side and a second rail coupler on an opposing posterior side, the first and second rail couplers slidably mountable on opposing rails of a surgical bed frame allowing the thoracic bolster assembly to be adjusted longitudinally along the opposing rails of the surgical bed frame;

wherein the upper portion of the thoracic bolster assembly is further adjustable in a posterior and/or anterior direction relative to the base;

a pelvic anterior paddle attached to a first anterior side of the upper portion to support the patient's anterior pelvis and a pelvic posterior paddle attached to a second posterior side of the upper portion to support the patient's posterior pelvis.

Embodiment 17: The patient positioning system of embodiment 16, wherein at least one of the thoracic anterior paddle, thoracic posterior paddle, pelvic anterior paddle, and pelvic posterior paddle is removable.

Embodiment 18: The patient positioning system of embodiment 16 or 17, wherein the thoracic anterior paddle comprises an arm support portion to support a patient's arm.

Embodiment 19: The patient positioning system of embodiment 16 or embodiment 17, wherein the posterior paddle is substantially U-shaped to allow for surgical access to the patient's thoracic spine.

Embodiment 20: The patient positioning system of any one of embodiment 16, 17, 18, or 19, wherein the first and second rail couplers of the pelvic bolster assembly comprise channels with an open side and the first and second rail couplers of the thoracic bolster assembly comprise channels with an open side.

Embodiment 21: A method of placing a patient on a lateral patient positioning system, the method comprising:

selecting the patient positioning system of any one of embodiment 1, 2, 3, 4, 5, 6, 7, 8, 9, 10, 11, 12, 13, 14, 15, 16, 17, 18, 19, or 20;

adjusting the thoracic bolster assembly longitudinally along the opposing rails of the surgical bed frame;

adjusting the pelvic bolster assembly longitudinally along the opposing rails of the surgical bedframe; and placing the patient in a lateral position over the thoracic bolster assembly and the pelvic bolster assembly.

Embodiment 22: The method of embodiment 21, wherein placing the patient in a lateral position over the thoracic and pelvic bolster assemblies comprises, first, placing the patient in a supine position over the thoracic and pelvic bolster assemblies and, second, rotating the patient from the supine position to the lateral position.

Embodiment 23: The method of embodiment 21, further comprising-before placing the patient in a lateral position over the thoracic bolster assembly and the pelvic bolster assembly-placing a thoracic bolster assembly loading bolster adjacent to the upper portion of the thoracic bolster assembly and placing a pelvic bolster assembly loading bolster adjacent to the upper portion of the pelvic bolster assembly.

Embodiment 24: The method of embodiment 23, further comprising removing the thoracic bolster assembly loading bolster and the pelvic bolster assembly loading bolster after placing the patient in the lateral position.

Embodiment 25: The method of embodiment 21 or 24, further comprising adjusting the upper portion of the thoracic bolster assembly laterally in a posterior and/or anterior direction; and adjusting the upper portion of the pelvic bolster assembly laterally in a posterior and/or anterior direction.

Embodiment 26: The method of any one of embodiment 21, 22, 23, 24, or 25, further comprising attaching the thoracic posterior paddle to the thoracic bolster assembly and attaching the pelvic posterior paddle to the pelvic bolster assembly.

Embodiment 27: The method of embodiment 26, further comprising adjusting each posterior paddle in the sagittal and/or coronal plane of the patient.

Embodiment 28: A patient positioning system comprising:

a thoracic bolster assembly configured to be releasably and slidably secured to a pair of rails of a surgical table toward one end of the surgical table;

a pelvic bolster assembly configured to be releasably and slidably secured to the pair of rails of the surgical table at a position caudal to that of the thoracic bolster assembly;

wherein at least one of the thoracic and pelvic bolster assemblies is further configured to pivot relative to a plane defined by the rails of the surgical table to induce a lateral curvature to a portion of the patient's spine.

Embodiment 29: The system of embodiment 28, wherein at least one of the thoracic and pelvic assemblies includes one or more lateral paddles.

Embodiment 30: The system of embodiment 29, wherein the one or more lateral paddles are removably secured to the thoracic and/or pelvic assemblies.

Embodiment 31: The system of embodiment 29 or 30, wherein the one or more lateral paddle are adjustable in at least of the sagittal, coronal, and axial planes of the patient.

Embodiment 32: The system of any one of embodiment 28, 29, 30, or 31, wherein at least one of the thoracic and pelvic bolster assemblies is further configured to translate the patient resting thereon in a lateral position closer to one rail or the other.

Embodiment 33: The system of embodiment 32, wherein the at least one of the thoracic and pelvic bolsters comprises a base and an upper portion, and wherein the upper portion is configured to translate relative to the base.

Embodiment 34: The system of embodiment 32 or 33, wherein both the thoracic and pelvic bolster assemblies are configured to translate the patient closer to one rail or the other.

Embodiment 35: The system of any one of embodiment 29, 30, 31, 32, 33, or 34, wherein each of the thoracic and pelvic bolster assemblies includes two lateral paddles: an anterior lateral paddle and a posterior lateral paddle.

Embodiment 36: The system of any one of embodiment 28, 29, 30, 31, 32, 33, 34, or 35, further comprising removable thoracic and pelvic loading bolsters configured to provide a larger surface area for patient loading and unloading.

Embodiment 37: A method of placing a patient on a lateral patient positioning system, the method comprising:

selecting the patient positioning system of any one of embodiment 28, 29, 30, 31, 32, 33, 34, 35, or 36;

adjusting the thoracic and pelvic bolster assemblies longitudinally along the opposing rails of the surgical table based on at least one of the patient's height, size, weight, and a surgeon's preference;

placing the patient in a lateral position on the thoracic bolster assembly and the pelvic bolster assembly;

securing the patient to the lateral patient positioning system; and pivoting at least one of the thoracic and pelvic bolster assemblies relative to a plane defined by the rails of the surgical table so as to induce a lateral curvature to a portion of the patient's spine.

Embodiment 38: The method of embodiment 37, further comprising—before placing the patient in the lateral position on the thoracic and pelvic bolster assemblies—placing thoracic and pelvic loading bolsters on the lateral patient positioning system to provide a larger surface area for patient loading and unloading.

Embodiment 39: The method of embodiment 38, further comprising—after placing the patient in the lateral position on the thoracic and pelvic bolster assemblies—removing the thoracic and pelvic loading bolsters.

Embodiment 40: The method of any one of embodiment 37, 38, or 39, wherein placing the patient in the lateral position on the thoracic and pelvic bolster assemblies comprises, first, placing the patient in a supine position on the thoracic and pelvic bolster assemblies and, second, rotating the patient from the supine position to the lateral position.

Embodiment 41: The method of embodiment 40, wherein the lateral position of the patient consists of the patient lying on his or her right side.

Embodiment 42: The method of embodiment 40, wherein the lateral position of the patient consists of the patient lying on his or her left side.

Embodiment 43: The method of any one of embodiment 37, 38, 39, 40, 41, or 42, further comprising-after placing the patient in the lateral position on the thoracic and pelvic bolster assemblies-securing to each of the thoracic and pelvic bolster assemblies a thoracic posterior paddle and a pelvic posterior paddle.

Embodiment 44: The method of embodiment 43, wherein securing the thoracic posterior paddle and the pelvic posterior paddle comprises adjusting each posterior bolster in at least one of a sagittal, axial, and coronal plane relative to the patient.

The various embodiments described above, including elements of the various embodiments described above, can be combined to provide further embodiments. Various portions and components of apparatus within the scope of this disclosure, including for example, structural components, can be formed by one or more various suitable manufacturing processes known to those in the art. Similarly, various portions and components of apparatuses within the scope of this disclosure can be made from suitable materials known to those in the art.

Exemplary embodiments of the present disclosure will be described in detail with reference to the accompanying drawings. Advantages and features of the present disclosure and methods accomplishing them will become apparent from the following description of exemplary embodiments with reference to the accompanying drawings.

It will be appreciated that various aspects discussed in reference to one drawing may be present and/or used in conjunction with the embodiment shown in another drawing, and each element shown in multiple drawings may be discussed only once.

Reference in the specification to "one configuration," "one embodiment," "a configuration," or "an embodiment" means that a particular feature, structure, or characteristic described in connection with the configuration is included in at least one configuration, but is not a requirement that such feature, structure, or characteristic be present in any particular configuration unless expressly set forth in the embodiments as being present.

Furthermore, the described features, structures, or characteristics of configurations of the disclosed subject matter may be combined in any suitable manner in one or more configurations. Configurations of the disclosed subject matter may be practiced without one or more of the specific details, or with other methods, components, materials, and so forth. In other instances, well-known structures, materials, or operations are not shown or described in detail to avoid obscuring aspects of the invention.

It should also be noted that, as used in this specification and the appended embodiments, singular forms such as "a," "an," and "the" may include the plural unless the context clearly dictates otherwise. Thus, for example, reference to "a base" may include one or more of such bases, and reference to "the bolster" may include reference to one or more of such bolsters.

As used herein, a plurality of items, structural elements, compositional elements, and/or materials may be presented in a common list for convenience. However, these lists should be construed as though each member of the list is individually identified as a separate and unique member. Unless otherwise indicated, all numbers expressing quantities used in the specification and embodiments are to be understood as being modified in all instances by the term "about." Accordingly, unless indicated to the contrary, the numerical parameters set forth in the specification and attached embodiments are approximations that may vary depending upon the desired properties sought to be obtained by the embodiments of the present disclosure. At the very least, and not as an attempt to limit the application of the doctrine of equivalents to the scope of the embodiments, each numerical parameter should at least be construed in light of the number of reported significant digits and by applying ordinary rounding techniques. Notwithstanding that the numerical ranges and parameters setting forth the broad scope of the present disclosure are approximations, the numerical values set forth in the specific examples are reported as precisely as possible. Any numerical value, however, inherently contains certain errors necessarily resulting from the standard deviation found in their respective testing measurements. In one embodiment, the terms "about" and "approximately" refer to numerical parameters within 10% of the indicated range.

All methods described herein can be performed in any suitable order unless otherwise indicated herein or otherwise clearly contradicted by context. The use of any and all examples, or exemplary language (e.g., "such as") provided herein is intended merely to better illuminate the embodiments of the present disclosure and does not pose a limitation on the scope of the present disclosure. No language in the specification should be construed as indicating any non-claimed element essential to the practice of the embodiments of the present disclosure.

As used herein, a "coronal plane" refers to a plane dividing the body into anterior and posterior parts, and any plane parallel to the coronal plane. A "sagittal plane" refers to a plane dividing the body into left and right parts, and any plane parallel to the sagittal plane. A "sagittal axis" refers to a rotational axis lying in the sagittal plane.

Additionally, the surgical frame bed is referred to as having a longitudinal plane which runs along the length of the surgical bed frame. Patients are typically positioned on the surgical bed frame with the sagittal plane of their body along or substantially parallel to the longitudinal plane of the surgical bed frame. The lateral plane of the bed frame is perpendicular to the longitudinal plane. With a patient in the lateral decubitus position, the lateral plane of the bed frame coincides with the coronal plane of the patient.

The above description has set out various features, functions, methods, and other aspects of the disclosure. Time and further development may change the manner in which the various aspects are implemented. The scope of protection defined by the claims is not intended to be limited to the specific sizes, shapes, features, or other aspects of the disclosed embodiments. The claimed inventions may be implemented or embodied in other forms while still being within the scopes of the concepts disclosed hereby. Also included are equivalents of the elements of the claims that can be made without departing from the scopes of concepts properly protected by the claims that follow.

What is claimed:

1. A patient positioning system, comprising:

a thoracic bolster assembly comprising:

a frame, a base, and an upper portion, the base in connection with the frame via an angular adjustment mechanism to adjust the base in a coronal plane, the frame comprising a first rail coupler on a first anterior side and a second rail coupler on an opposing posterior side, the first and second rail couplers slidably mountable on opposing rails of a surgical bed frame allowing the thoracic bolster assembly to be adjusted longitudinally along the opposing rails of the surgical bed frame;

wherein the upper portion of the thoracic bolster assembly is coupled to the base and is further adjustable in a posterior and/or anterior direction relative to the base;

a thoracic anterior paddle attached to a first anterior side of the upper portion to support a patient's chest and a thoracic posterior paddle attached to a second posterior side of the upper portion to support a posterior portion of the patient;

a pelvic bolster assembly comprising:

a frame, a base, and an upper portion, the base in connection with the frame via an angular adjustment mechanism to cause movement of the base in a coronal plane, the frame comprising a first rail coupler on a first anterior side and a second rail coupler on an opposing posterior side, the first and second rail couplers slidably mountable on opposing rails of a surgical bed frame allowing the thoracic bolster assembly to be adjusted longitudinally along the opposing rails of the surgical bed frame;

wherein the upper portion of the thoracic bolster assembly is further adjustable in a posterior and/or anterior direction relative to the base;

a pelvic anterior paddle attached to a first anterior side of the upper portion to support the patient's anterior pelvis and a pelvic posterior paddle attached to a second posterior side of the upper portion to support the patient's posterior pelvis.

2. The patient positioning system of claim 1, wherein at least one of the thoracic anterior paddle, thoracic posterior paddle, pelvic anterior paddle, and pelvic posterior paddle is removable.

3. The patient positioning system of claim 1, further comprising a lower arm support attachable to the first anterior side of the upper portion of the thoracic bolster assembly.

4. The patient positioning system of claim 3, wherein the lower arm support is adjustable between a first, laterally extended position and a second, longitudinally extended position.

5. The patient positioning system of any one of claim 1, wherein the thoracic bolster assembly further comprises a head support coupled to the thoracic posterior paddle.

6. The patient positioning system of claim 5, wherein the head support is coupled to the thoracic posterior paddle via an adjustable arm.

7. The patient positioning system of claim 6, wherein the adjustable arm is connected to the thoracic posterior paddle via a dovetail hinge on a top side of the thoracic posterior paddle, such that the adjustable arm may be installed and removed through a vertical motion.

8. The patient positioning system of any one of claim 1, wherein the angular adjustment mechanism is a leadscrew/nut, gear drive, a worm gear, rack and pinion, or hypoid.

9. The patient positioning system of any one of claim 1, wherein the first rail coupler and second rail coupler include a channel for receiving one of the opposing rails of the surgical bed frame.

10. The patient positioning system of any one of claim 1, wherein at least one of the thoracic anterior paddle, lower arm support, and thoracic posterior paddle further comprises a deformable pad removably attached thereto.

11. The patient positioning system of any one of claim 1, wherein at least one upper portion is connected to its base via a screw and nut, and wherein the screw comprises a drive having a recess formed therein, the patient positioning system further comprising a handle with a boss for insertion into the recess of the screw to turn the screw and move the at least one upper portion relative to its base in a posterior and/or anterior direction.

12. The patient positioning system of any one of claim 1, wherein the pelvic posterior bolster further comprises a thigh support.

13. The patient positioning system of claim 12, wherein the thigh support is adjustable in the coronal plane and a sagittal plane.

14. The patient positioning system of any one of claim 1, wherein the thoracic anterior paddle and the thoracic posterior paddle are adjustable in the coronal plane and a sagittal plane.

15. The patient positioning system of any one of claim 1, wherein the pelvic anterior paddle and the pelvic posterior paddle are adjustable in the coronal plane and a sagittal plane.

16. A patient positioning system, comprising:

a thoracic bolster assembly comprising:

a frame connected to a base connected to an upper portion, the frame comprising a first rail coupler on a first anterior side and a second rail coupler on an opposing posterior side, the first and second rail couplers slidably mountable on opposing rails of a surgical bed frame allowing the thoracic bolster assembly to be adjusted longitudinally along opposing rails of a surgical bed frame;

wherein the upper portion of the thoracic bolster assembly is further adjustable in a posterior and/or anterior direction relative to the base;

a thoracic anterior paddle attached to a first anterior side of the upper portion to support a patient's chest and a posterior paddle attached to a second posterior side of the upper portion to support a posterior portion of a patient's head and shoulders;

a pelvic bolster assembly comprising:

a frame, a base, and an upper portion, the base in connection with the frame via an angular adjustment mechanism to cause movement of the base in a coronal plane, the frame comprising a first rail coupler on a first anterior side and a second rail coupler on an opposing posterior side, the first and second rail couplers slidably mountable on opposing rails of a surgical bed frame allowing the thoracic bolster assembly to be adjusted longitudinally along the opposing rails of the surgical bed frame;

wherein the upper portion of the thoracic bolster assembly is further adjustable in a posterior and/or anterior direction relative to the base;

a pelvic anterior paddle attached to a first anterior side of the upper portion to support the patient's anterior pelvis and a pelvic posterior paddle attached to a second posterior side of the upper portion to support the patient's posterior pelvis.

17. The patient positioning system of claim 16, wherein at least one of the thoracic anterior paddle, thoracic posterior paddle, pelvic anterior paddle, and pelvic posterior paddle is removable.

18. The patient positioning system of claim 16, wherein the thoracic anterior paddle comprises an arm support portion to support a patient's arm.

19. The patient positioning system of any one of claim 16, wherein the first and second rail couplers of the pelvic bolster assembly comprise channels with an open side and the first and second rail couplers of the thoracic bolster assembly comprise channels with an open side.

20. A method of placing a patient on a lateral patient positioning system, the method comprising:

selecting the patient positioning system of claim 1;

adjusting the thoracic bolster assembly longitudinally along the opposing rails of the surgical bed frame;

adjusting the pelvic bolster assembly longitudinally along the opposing rails of the surgical bed frame; and placing the patient in a lateral position over the thoracic bolster assembly and the pelvic bolster assembly.

* * * * *